United States Patent [19]
Clark
[11] 3,832,493
[45] Aug. 27, 1974

[54] DIGITAL SPEECH DETECTOR

[75] Inventor: James M. Clark, Cedar Grove, N.J.

[73] Assignee: International Telephone and Telegraph Corporation, Nutley, N.J.

[22] Filed: June 18, 1973

[21] Appl. No.: 371,191

[52] U.S. Cl. .......... 179/15 AS
[51] Int. Cl. .......... H04j 5/00
[58] Field of Search .......... 179/15 AS

[56] References Cited

UNITED STATES PATENTS

| | | | |
|---|---|---|---|
| 3,649,766 | 3/1972 | La Marche | 179/15 AS |
| 3,706,091 | 12/1972 | May | 179/15 AS |
| 3,712,959 | 1/1973 | Fariello | 179/15 AS |

*Primary Examiner*—Ralph D. Blakeslee
*Attorney, Agent, or Firm*—John T. O'Halloran; Menotti J. Lombardi, Jr.; Alfred C. Hill

[57] ABSTRACT

This relates to a digital speech detector applicable to a TASI communication system wherein the detector detects the presence or absence of speech in a plurality of digital code groups each of which indicate a quantized amplitude of a speech sample. The speech detector is divided into two portions. The first portion is an instantaneous detector that detects the quantized amplitude of each of the code groups in sequence and produces an up count signal when the detected quantized amplitude is greater than a first threshold value or less than a second threshold value less than the first threshold value and produces a down count signal when the detected quantized amplitude is between the first and second threshold values. The second portion includes an integrating counting circuit which integrates the up and down count signals and produces a resultant value of integration. The counting circuit produces a second output signal indicating speech activity in the code groups when the value of integration is above a third threshold value and produces a second output signal indicating an absence of speech activity in the code groups when the value of integration is below the third threshold value. The counting circuit has three different counting rates. The greatest counting rate occurs between a minimum count level and the third threshold value until the third threshold value is reached. An intermediate counting rate occurs between the third threshold value after it has been reached and a maximum count level until the maximum count level is reached. The smallest counting rate occurs between the maximum count level after it has been reached and the minimum count level until the minimum count level is reached again. The first output signal from the counting circuit is the signal that controls the assignment of those PCM code groups having speech activity to a particular one of the TASI channels transmitted from the transmitting portion of the TASI communication system.

23 Claims, 43 Drawing Figures

DIGITAL SPEECH DETECTOR

BACKGROUND OF THE INVENTION

This invention relates to a TASI (time assignment speech interpolation) communication system and more particularly to a digital speech detector employed in the transmitting portion thereof.

SUMMARY OF THE INVENTION

An object of the present invention is to provide an improved digital speech detector capable of being employed in the transmitting portion of a TASI communication system.

A feature of the present invention is the provision of a digital speech detector to detect the presence or absence of speech in a plurality of digital code groups, each of the code groups indicating a quantized amplitude of a speech sample comprising: a source of the code groups; first means coupled to the source to detect the quantized amplitude of the code groups, the first means producing a first control signal when the detected quantized amplitude is greater than a first threshold value and less than a second threshold value different than the first threshold value and producing a second control signal when the detected quantized amplitude is between the first and second threshold values; and second means coupled to the first means to integrate the first and second control signals and produce a resultant value of integration, the second means producing a first output signal indicating speech activity in the code groups when the value of integration is above a third threshold value and producing a second output signal indicating an absence of speech activity in the code groups when the value of integration is below the third threshold value.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
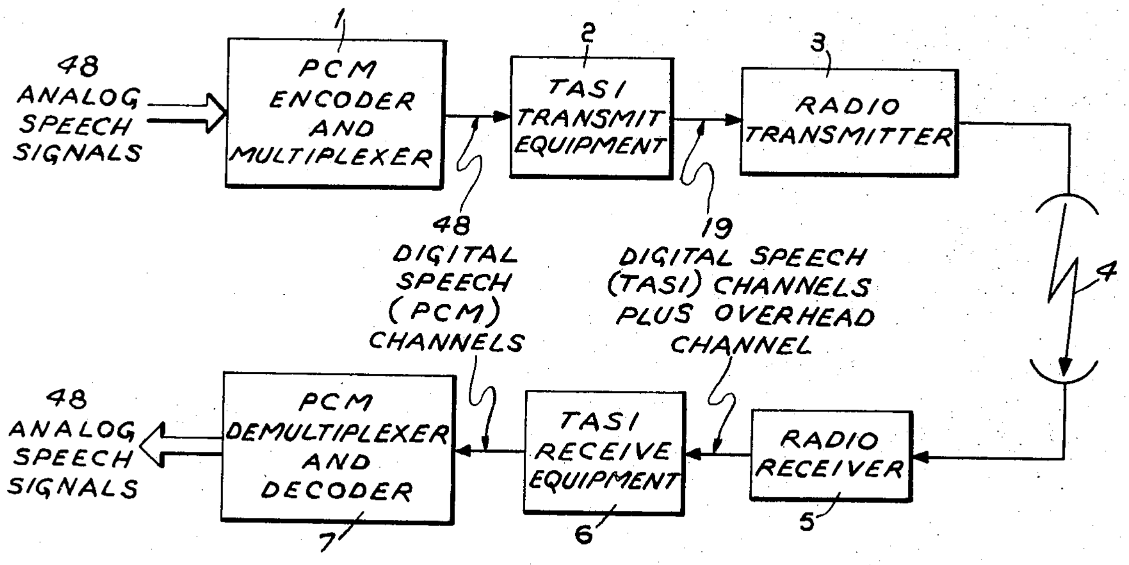
FIG. 1 is a block diagram of the basic components contained in a TASI communication system.

Referring to FIG. 1 there is illustrated a block diagram of the basic components of a TASI communication system. The equipment of this system automatically connects 19 or 48 incoming speech channels to 19 outgoing channels depending on the activity of the channels with the inactive channels being disconnected. The 19 outgoing channels and an overhead channel are transmitted, and the receiving part of the TASI communication system connects the 19 received channels to 19 of 48 channels corresponding to the incoming channels. An idle noise signal is provided as an output in the remaining 29 channels corresponding to disconnected incoming signals. This system reduces the cost of transmission by reducing the number of transmission channels, taking advantage of the fact that most of the source channels are inactive at any given moment of time. As illustrated in FIG. 1 the TASI system includes a PCM encoder and multiplexer 1 which receives 48 channels of analog speech signals and encodes these channel signals into digital speech signals and time multiplexes these speech channels into 48 digital speech channels to form a time division multiplex frame. The output of encoder and multiplexer 1 is then coupled to the TASI transmit equipment 2 where 19 of the 48 incoming digital channels are connected to 19 outgoing channels which are coupled to a radio transmitter 3 for transmission through a radio propagation medium 4 to a radio receiver 5. The 19 digital speech channels at the output of radio receiver 5 are connected to the TASI receive equipment 6 wherein the 19 received digital channels are connected to 19 of the 48 digital speech channels at the output thereof which are then coupled to the PCM demultiplexer and decoder 7 to recover the analog speech channels for coupling to their appropriate utilization devices. As indicated hereinabove, equipment 6 provides idle noise signals in the 29 channels which correspond to the disconnected incoming signals to encoder and multiplexer 1.

As mentioned hereinabove the TASI channels are transmitted for purposes of explanation through a radio propagation medium 4 by means of radio transmitter 3 and radio receiver 5. This equipment could just as easily be replaced by appropriate equipment to enable operation in a wire communication system, such as a telephone system.

It is important to understand that the data inputs and outputs of the TASI transmit and receive equipments 2 and 6 are time division multiplexed PCM coded speech signals. That is, all of the channels appear on one signal wire. There is one signal each for the transmit equipment input, transmit equipment output, receive equipment input and receive equipment output. A repeating period (called a frame) of such a signal is divided into time slots (smaller periods of time), one time slot for each channel. In each time slot for a speech channel, a n-bit PCM code, for instance, a 6-bit PCM code, representing a speech sample, is sent. In each time slot for the overhead channel, a 8-bit code is sent. This type of signal format allows one circuit to process all channels, one at a time.

For convenience, the output of equipment 2 and the input of equipment 6 are called TASI channels, and the input of equipment 2 and the output of equipment 6 are called PCM channels. Actually, the speech is PCM coded in both cases.

Figure 2:
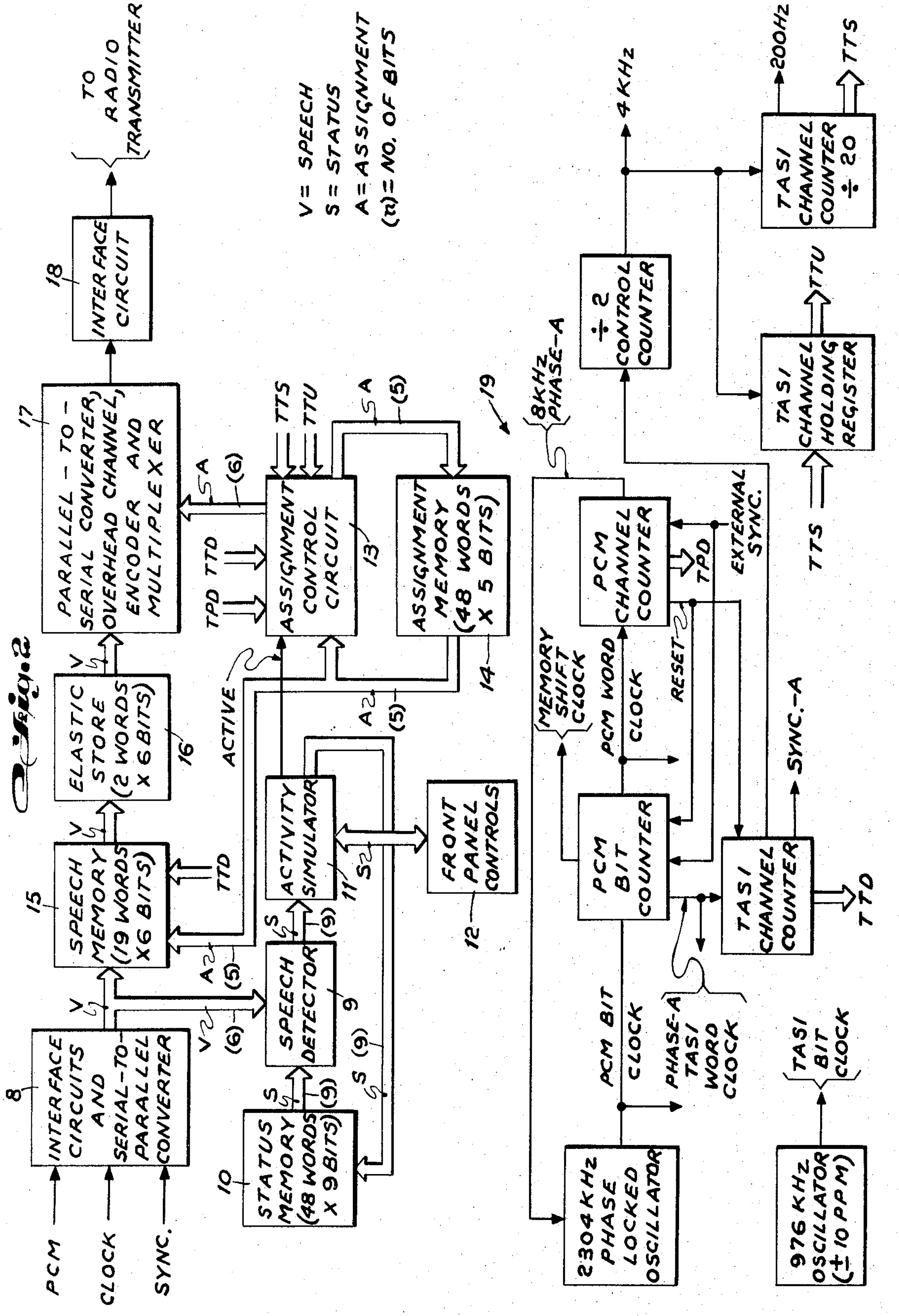
FIG. 2 is a block diagram of the TASI transmit equipment of FIG. 1 including the generator to produce the timing signals necessary for the operation thereof.

Referring to FIG. 2 the PCM input is coupled to the interface circuits and serial-to-parallel converter 8 to convert the serial PCM input to a parallel 6-bit format which is examined by speech detector 9. It is this speech detector to which the invention of the present application is directed. Speech detector 9 determines for each channel whether it is active or inactive, using a status word for each channel to average over many speech samples. The status words are taken from the status memory 10, processed by the speech detector 9 and the activity simulator 11 and returned to status memory 10. Activity simulator 11 also uses the status words to simulate random activity, steady activity, or steady inactivity for channels selected by the front panel controls 12. Simulator 11 also recognizes status words that indicate active status and sends an ACTIVE signal to the assignment control circuit 13. The ACTIVE signal has one time slot for each PCM channel. The assignment control circuit 13 controls the assignment (or connection) of PCM channels to TASI channels. The assignment of channels is stored in the assignment memory 14. The PCM speech codes are written into speech memory 15 according to the sequence of PCM channels. As each PCM speech code arrives, the number of the assigned TASI channel is read out of the assignment memory 14 and is sent to speech memory 15 to indicate the location in the speech memory wherein the arriving PCM speech code should be stored. If no TASI channel is assigned, however, a "blank" is read from assignment memory 14 and the PCM code is not stored in speech memory 15. The speech codes are read out of speech memory 15 according to the sequence of TASI channels. The speech codes read out pass through an elastic store 16 which allows for timing variations, are multiplexed with the overhead codes, are converted from parallel to serial format in parallel-to-serial converter, overhead channel encoder and multiplexer 17 the output of which is sent to the radio transmitter through interface circuit 18. The assignment control circuit 13 sends information from assignment memory 14 in the overhead channel so that the same information can be duplicated in a similar assignment memory in the TASI receive equipment. Assignment control 13 also can change this information as required by finding a TASI channel assigned to an inactive PCM channel, and reassigning it to an active PCM channel having no assigned TASI channel. A frame synchronization code is also sent in the overhead channel. The timing signal generator 19 generates the various timing signals required in the TASI transmit equipment. This timing signal generator needs no explanation herein since it does not play a part in the inventive speech detector as disclosed herein.

Figure 3:
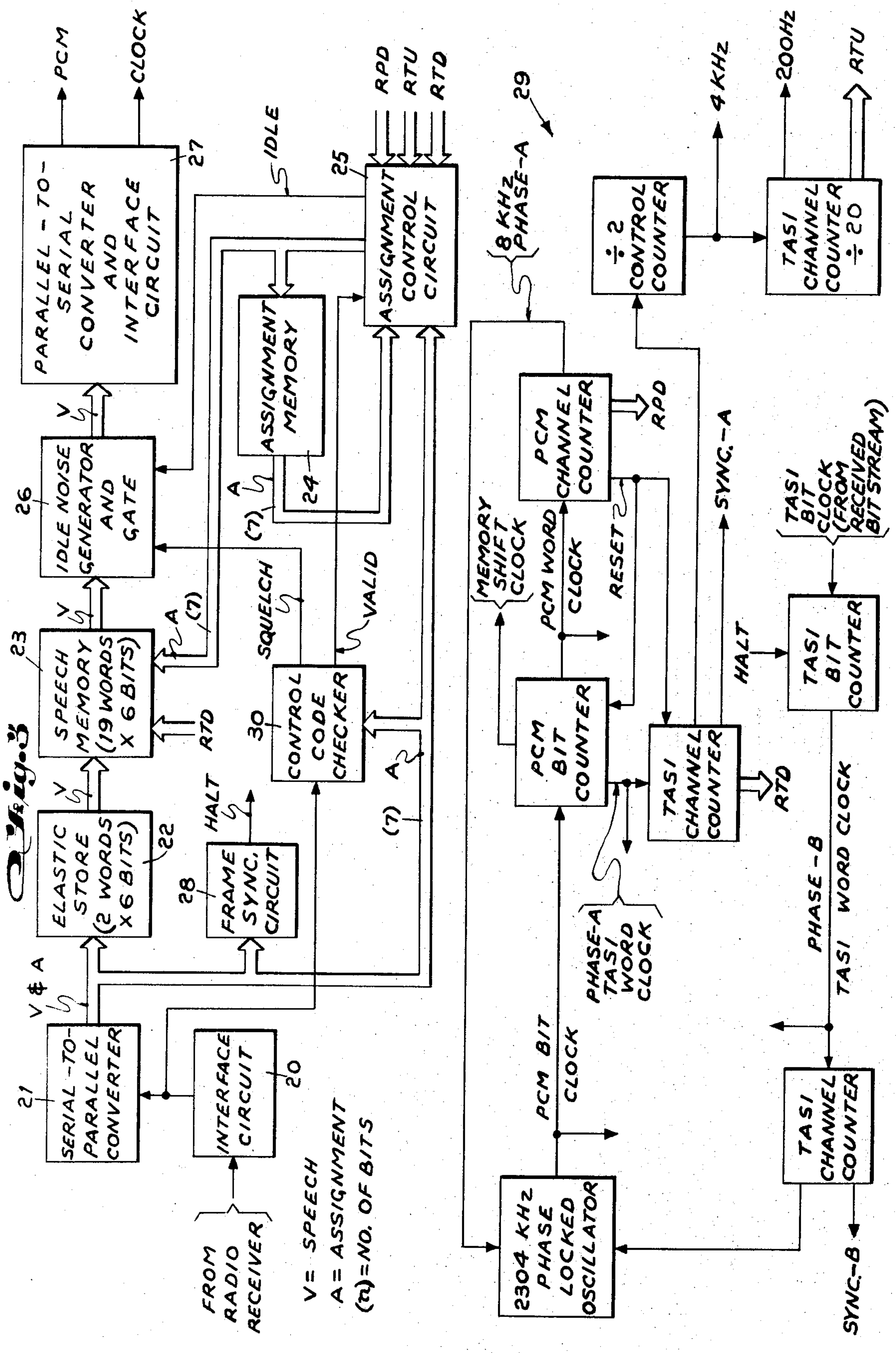
FIG. 3 is a block diagram of the TASI receive equipment of FIG. 1 including the generator to produce the timing signals necessary for the operation thereof.

Referring to FIG. 3 the speech codes from the radio receiver are coupled to interface circuit 20 in the TASI receive equipment and are converted from serial to parallel format in serial-to-parallel converter 21. The output of converter 21 passes through elastic store 22 to allow for timing variations and are written into speech memory 23 according to the sequence of the TASI channels. The PCM speech codes are read out of speech memory 23 according to the sequence of PCM channels. For each PCM speech code read, the number of the TASI channel assigned to the PCM channel is read from the assignment memory 24, and after processing by the assignment control circuit 25, is sent to speech memory 23 to indicate the location of the PCM code in speech memory 23. If no TASI channel was assigned to the PCM channel, a "blank" is read from assignment memory 24, and no PCM code is read from speech memory 23. The "blank" code is recognized by assignment control circuit 25 which sends an IDLE signal to idle noise generator and gate 26 to insert an idle noise code into the speech signal path. This simulates the idle noise of an inactive (idle) channel. The speech codes are converted from parallel to serial format in the parallel-to-serial converter and interface circuit 27 before being sent to the output PCM interface. The frame sync circuit 28 recognizes the frame sync code in the overhead channel and uses this to synchronize the timing counters of the timing signal control generator 29 for the TASI receive equipment by means of a HALT signal. The frame sync circuit 28 may take many different known forms, but preferably have the form as disclosed in either U.S. Pat. No. 3,597,539 or U.S. Pat. No. 3,594,502, whose disclosures are incorporated herein by reference. Control code checker 30 checks parity bits of the assignment control codes received on the overhead channel. If the parity bits are correct, the control code is considered valid (indicated by the VALID signal) and is used by assignment control circuit 25 to update assignment memory 24 to duplicate the contents of assignment memory 14 of the TASI transmit equipment of FIG. 2. Control codes are ignored if not valid. Also, if most recent control codes are not valid, all control codes are ignored and a SQUELCH signal is sent to the idle noise generator and gate 26 to quiet all channels. This prevents noise and incorrect assignments when the radio signal fades. Timing signal generator 29 illustrated in FIG. 3 was referred to briefly hereinabove with respect to frame sync circuit 28. The purpose of this circuit is to produce the various timing signals for the operation of the TASI receive equipment and the operation thereof is believed to be obvious and is not described in detail herein since it does not play a fundamental part in the operation of the inventive speech detector.

The ideal speech detector for TASI should operate only when speech is present and should not operate when noise and extraneous signals are present. A practical detector must represent a compromise between ideal operation on speech signals and ideal rejection of noise signals. In addition, the activity, or percentage of total time that a detector is operated, must be minimized. The parameters of the detector were chosen to ensure that it (1) operates when very low speech levels are present, (2) operates a minimum of time on line noise, and (3) minimizes the number of times a talker must be switched.

When the speech detector is made too sensitive, the detector operates on noise and thereby reduces the possible TASI advantage. Conversely, when the speech detector is not sensitive enough, part of the first syllable is lost before the detector is operated. To minimize these effects, the detector is made to have a fast detect time, and a slow release time. The release time must be as long as one syllable for speech continuity. The release time is chosen to be about 200 milliseconds, corresponding to the time length of one syllable.

To operate the speech detector the power on the line must remain above, typically, −32 dbm0 (decibel referred to 0 milliwatt) for six milliseconds (msec). Tests have shown this fast operate time results in increased operation of the speech detector by noise spikes which increases the activity. Most noise peaks last less than 6 msec. and are virtually eliminated by the 6 msec. operate time of the speech detector. Once the speech detector is operated, the connection cannot be released until the release time has elapsed. The effect of those noise peaks, which last from 6 to about 40 msec., are minimized by use of a deferred release characteristic. The minimum is about 16 msec. Noise peaks lasting substantially longer than 40 msec. are indistinguishable from speech syllables and operate the circuit with the same release time of 200 msec. The combination of 6 msec. operate time, −32 dbm0 sensitivity, and 200 msec. deferred release is about optimum for expected telephone speech and noise levels.

Figure 4:
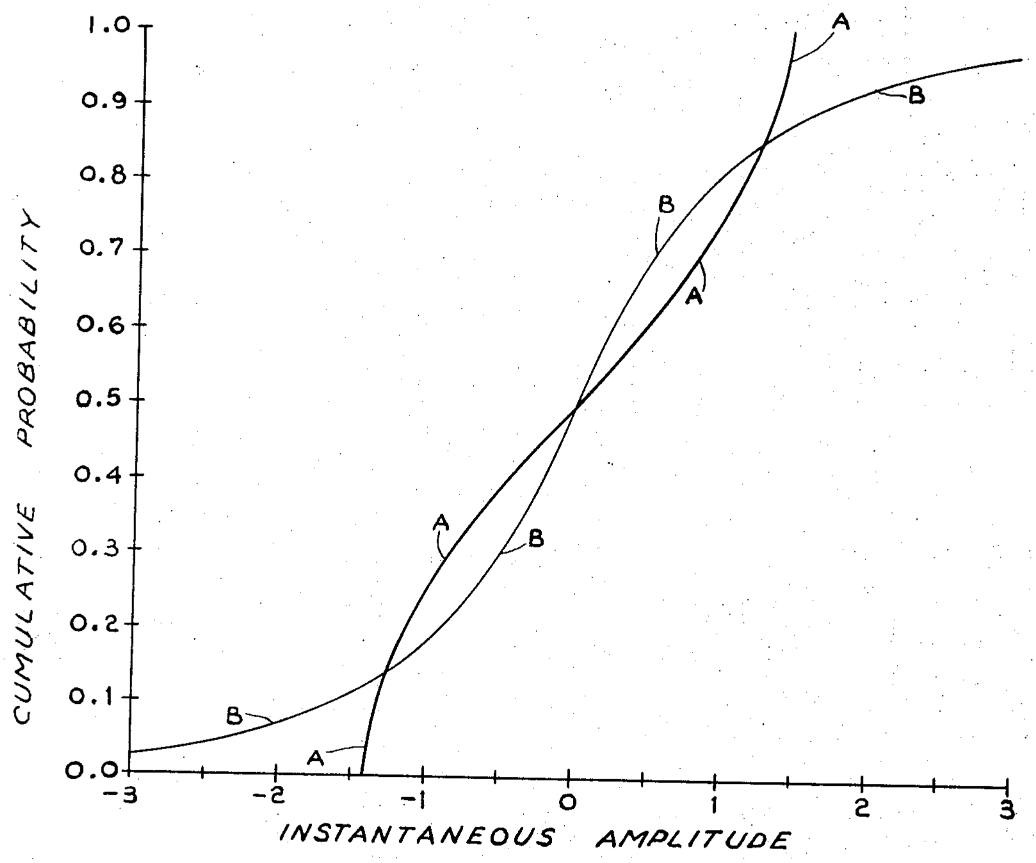
FIGS. 4–26 are graphs useful in explaining the operation of the speech detector of FIG. 2 in accordance with the principles of the present invention.

The speech detector is composed of two parts. The first part is an instantaneous detector without memory. Its response to individual speech samples does not depend on other speech samples. The second part has individual memory for each speech channel. All other circuitry is common (time shared). The second part averages or integrates the output of the first part and, therefore, its response at one time is dependent on many consecutive speech samples. It is assumed that the speech samples have random amplitudes and two cases are considered. Case one is a sinusoidal input (test tone). This input is random if the phase is unknown. If the ratio of the test frequency to the sampling frequency is not exactly a rational number, all phases will occur with equal probability. For a sine wave with rms (root mean square) amplitude equal to one and an offset equal to zero, the cumulative probability function is illustrated by Curve A of FIG. 4. The second case considered is a speech input when as assumed probability distribution which approximates the probability distribution of actual speech. For a speech signal having an rms amplitude equal to one and an offset equal to zero, the assumed cumulative probability function is shown by Curve B in FIG. 4.

From equations for these curves, the cumulative probability functions can be described for any rms amplitude equal to A and any offset (average, or DC (direct current)), amplitude equal to M.

The first part of the speech detector detects a "no signal" condition whenever the instantaneous X (speech sample) lies between two thresholds $t$ and $-t$.

$$-t < X < t$$

Figure 5:
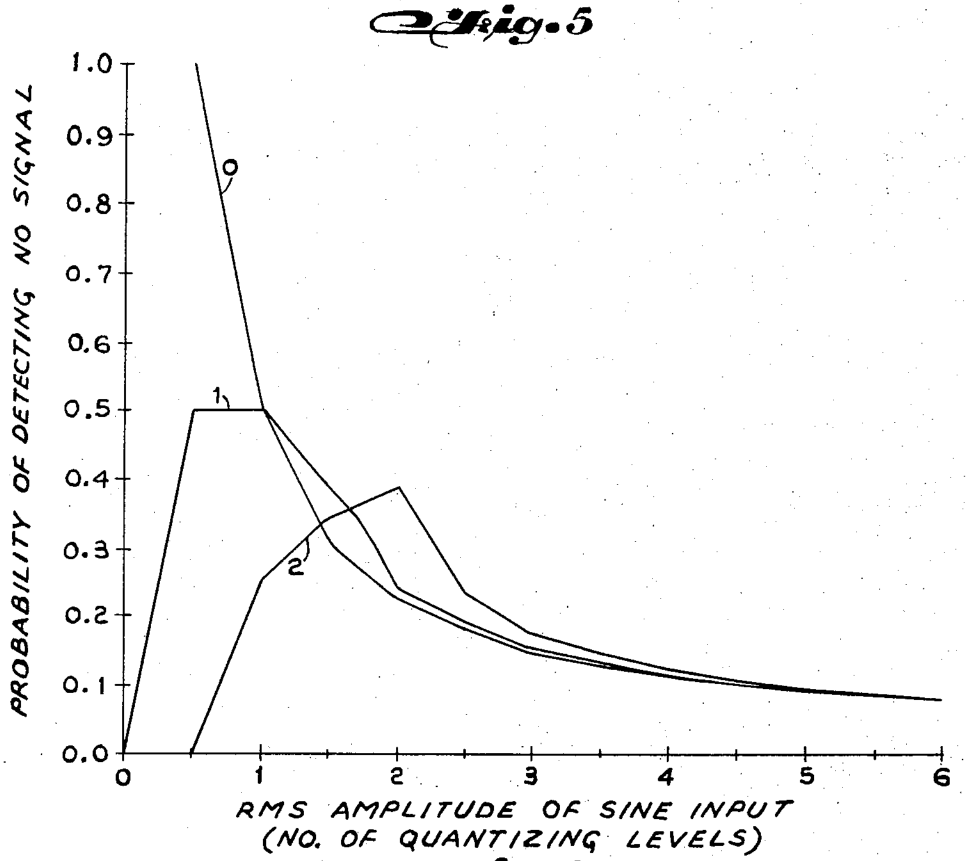
Figure 6:
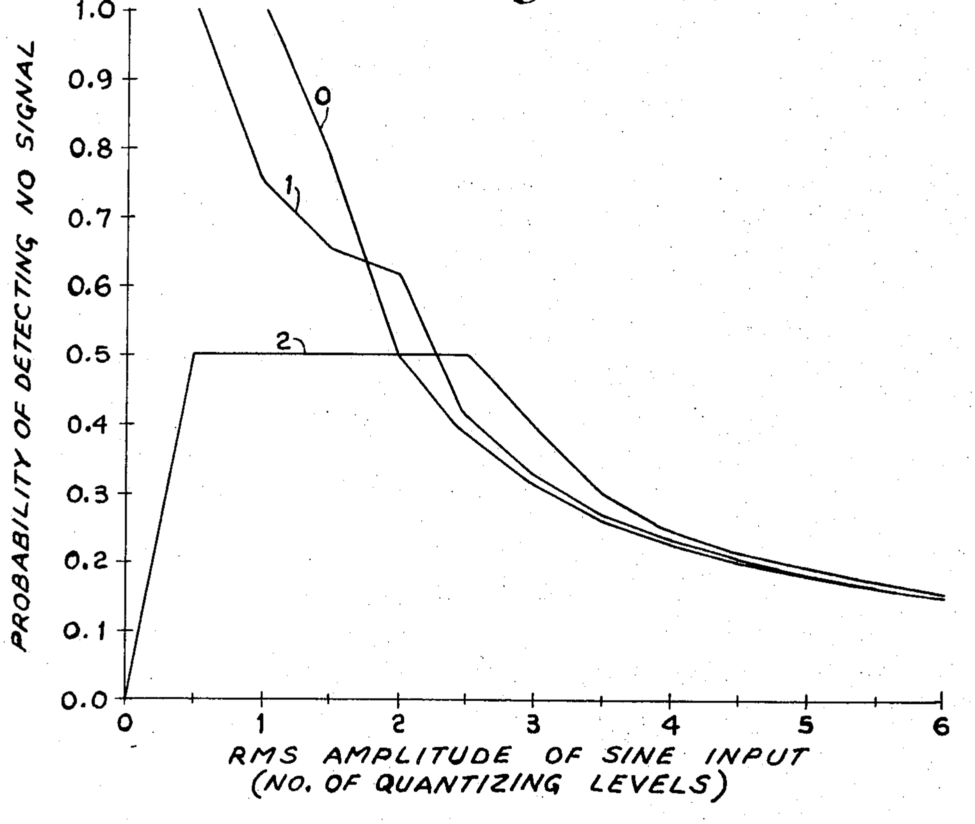
Figure 7:
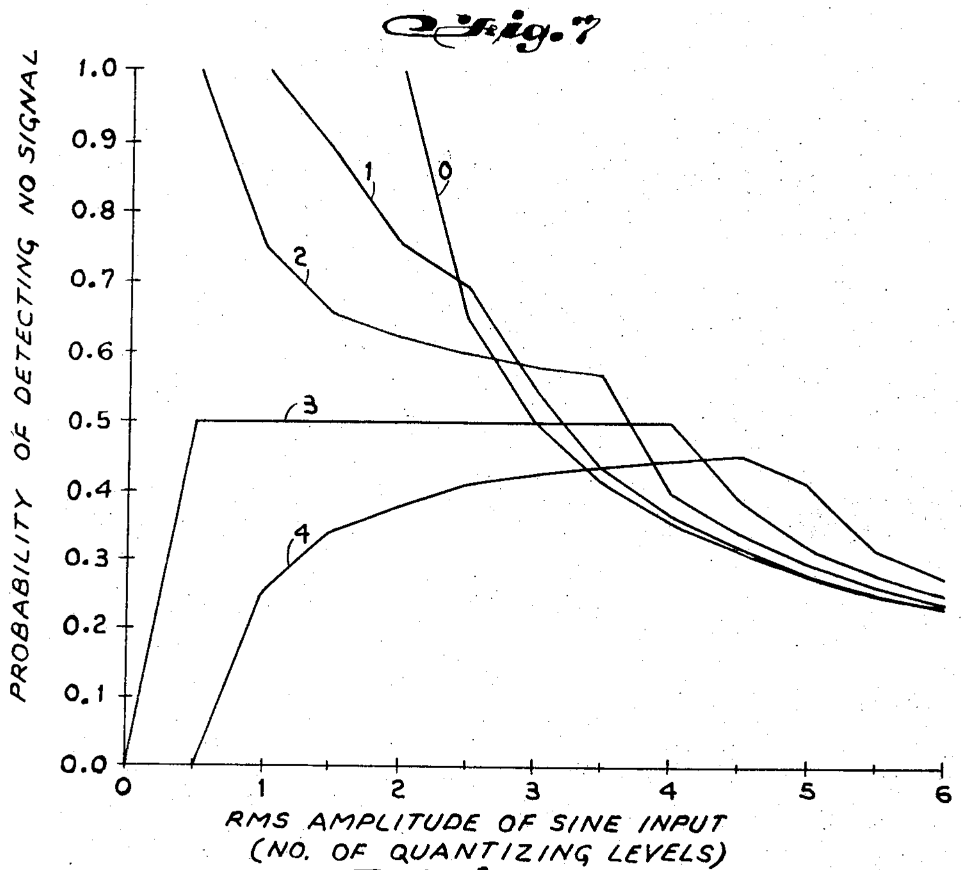
Figure 8:
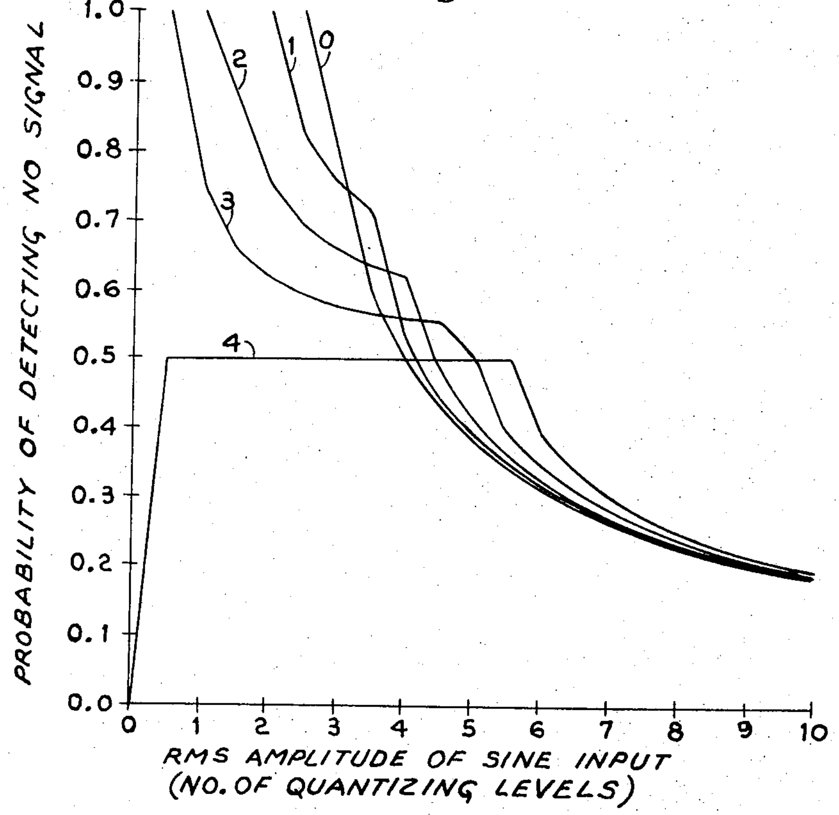
Figure 9:
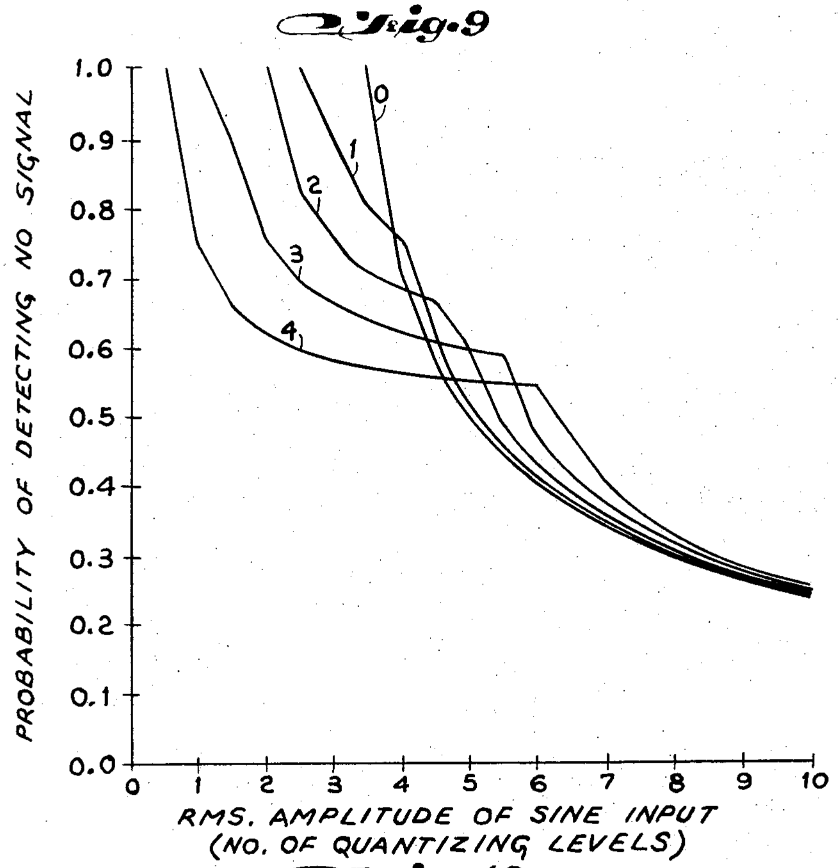
Figure 10:
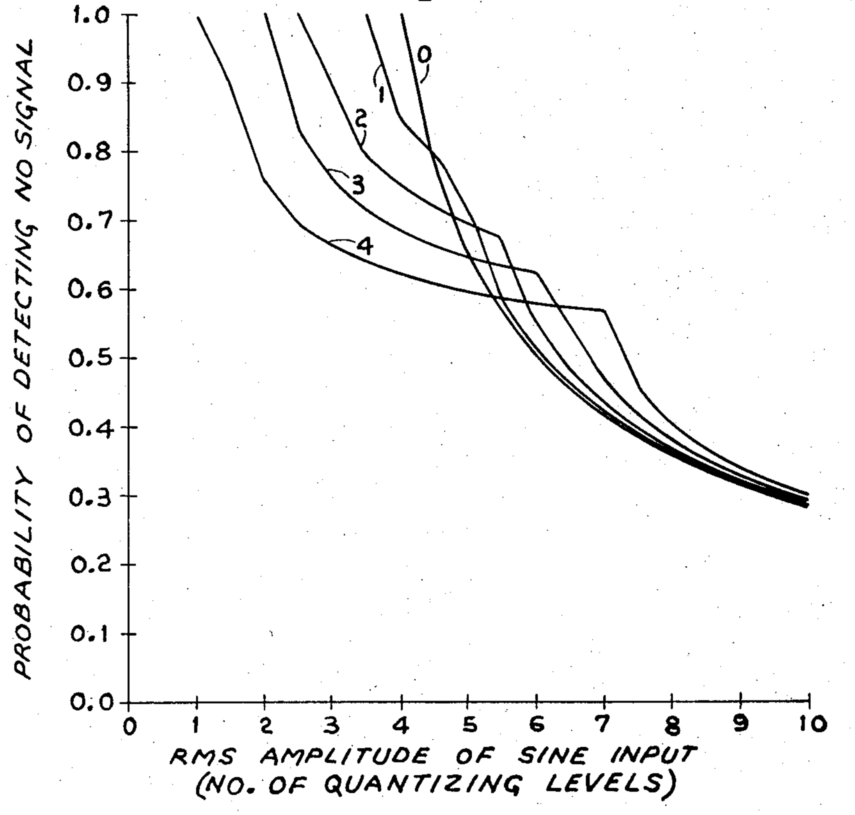

FIGS. 5–10 illustrate the probability $P_1$ of detecting no signal when plotted as a function of the rms amplitude A for various values of offset M and threshold ±t for the sinusoidal case. The curves of FIG. 5 illustrate the probability $P_1$ for offsets equal to 0, 1 and 2 levels with a threshold equal to ±1 level. FIG. 6 illustrates the curves of probability $P_1$ for offsets equal to 0, 1 and 2 levels with a threshold equal to ±2 levels. FIG. 7 illustrates the curves of the probability $P_1$ for offsets equal to 0, 1, 2, 3 and 4 levels with a threshold of ±3 levels. FIG. 8 illustrates the curves for the probability $P_1$ for offsets equal to 0, 1, 2, 3 and 4 levels with a threshold equal to ±4 levels. FIG. 9 illustrates the curves of the probability $P_1$ for offsets equal to 0, 1, 2, 3 and 4 levels with a threshold equal to ±5 levels. FIG. 10 illustrates the curves of the probability $P_1$ for offsets equal to 0, 1, 2, 3 and 4 levels with a threshold of ±6 levels.

Figure 11:
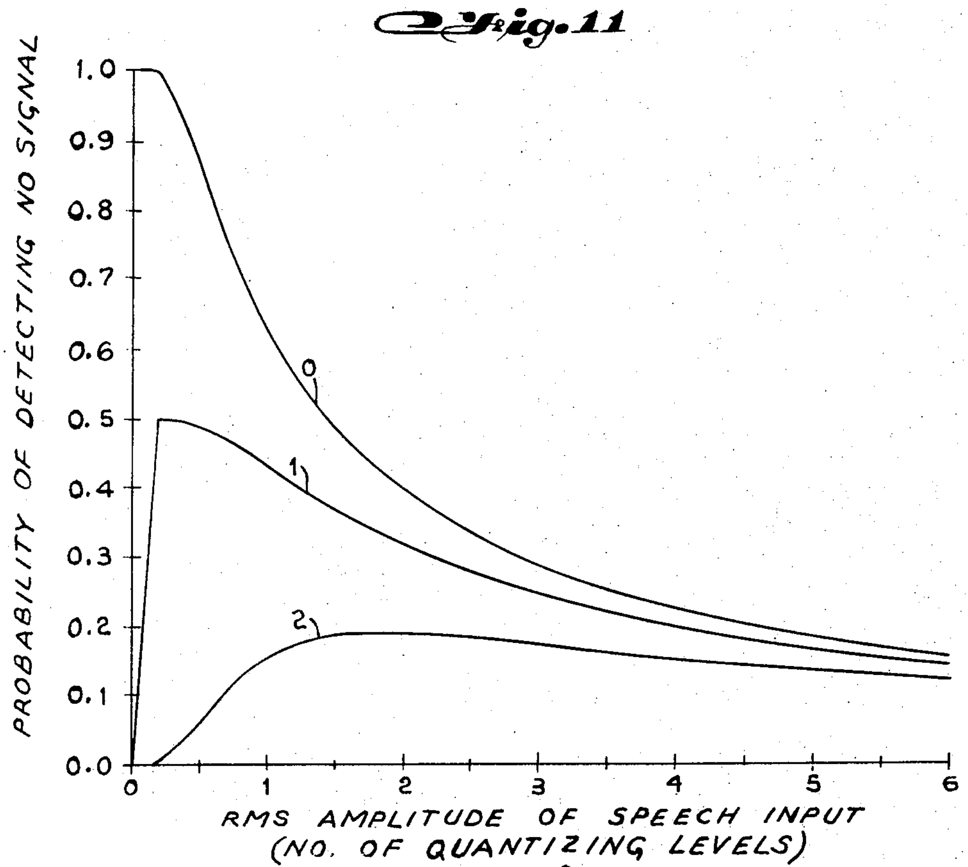
Figure 12:
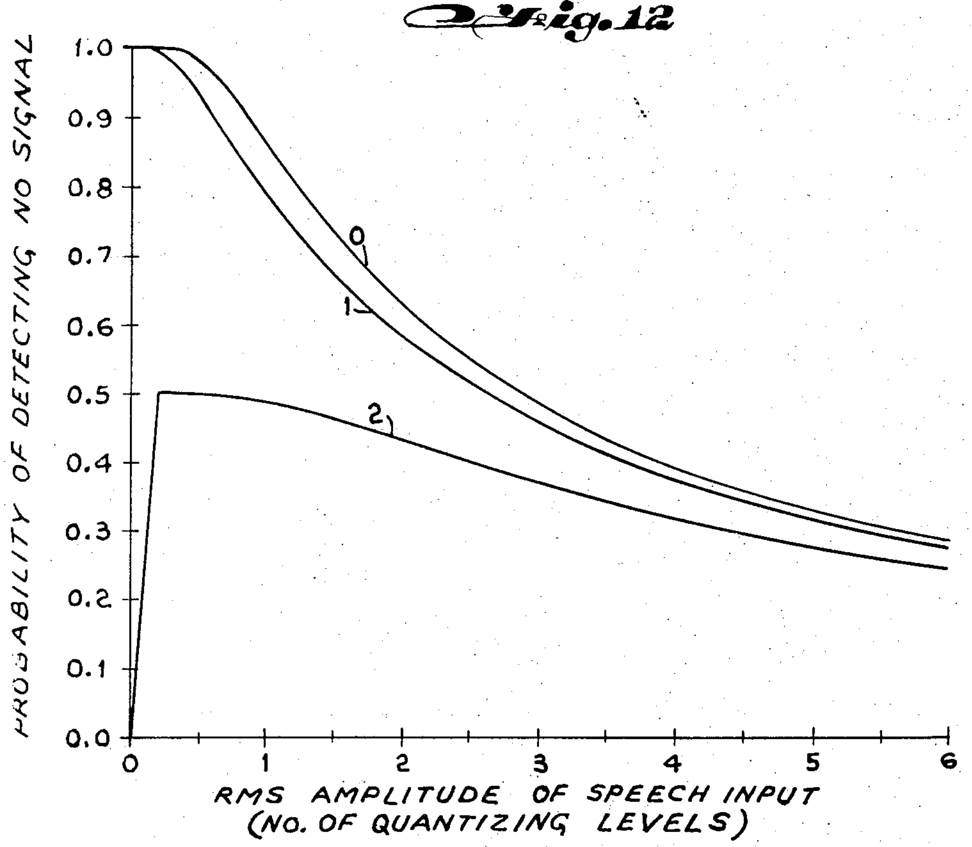
Figure 13:
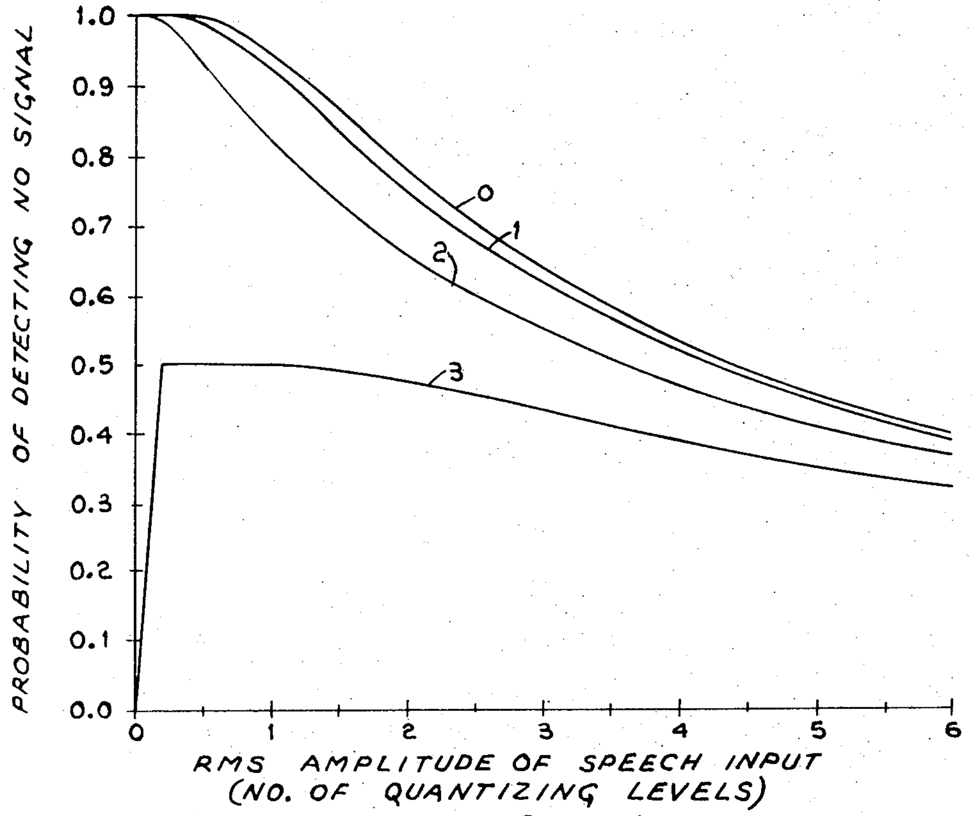
Figure 14:
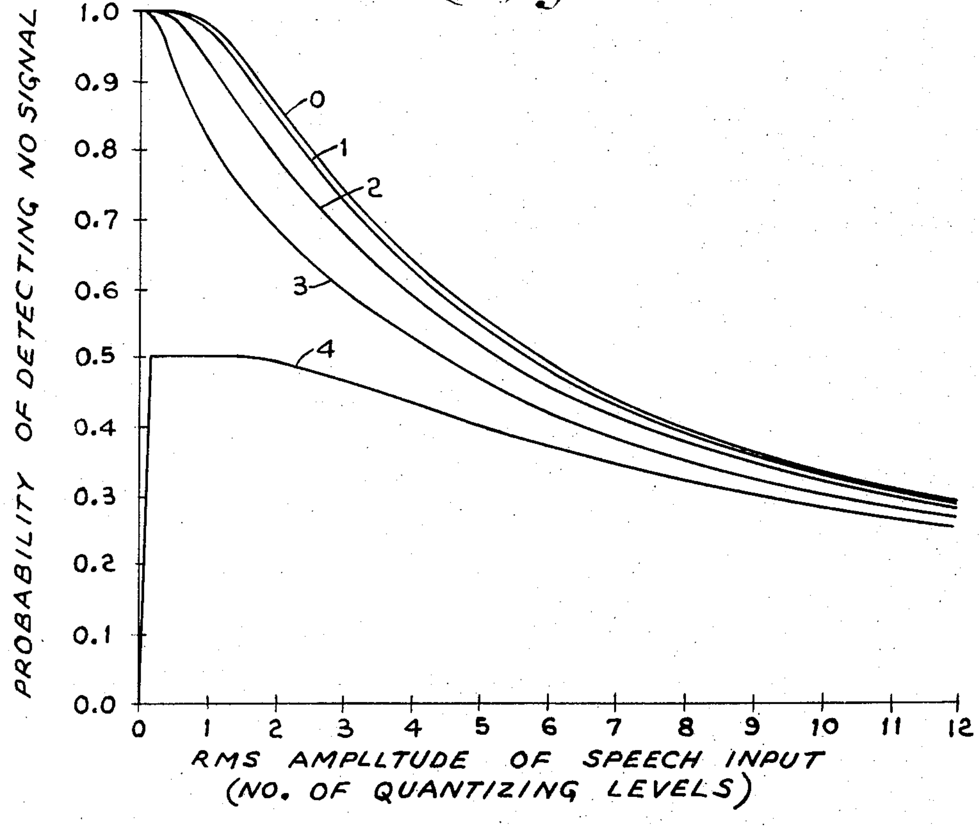
Figure 15:
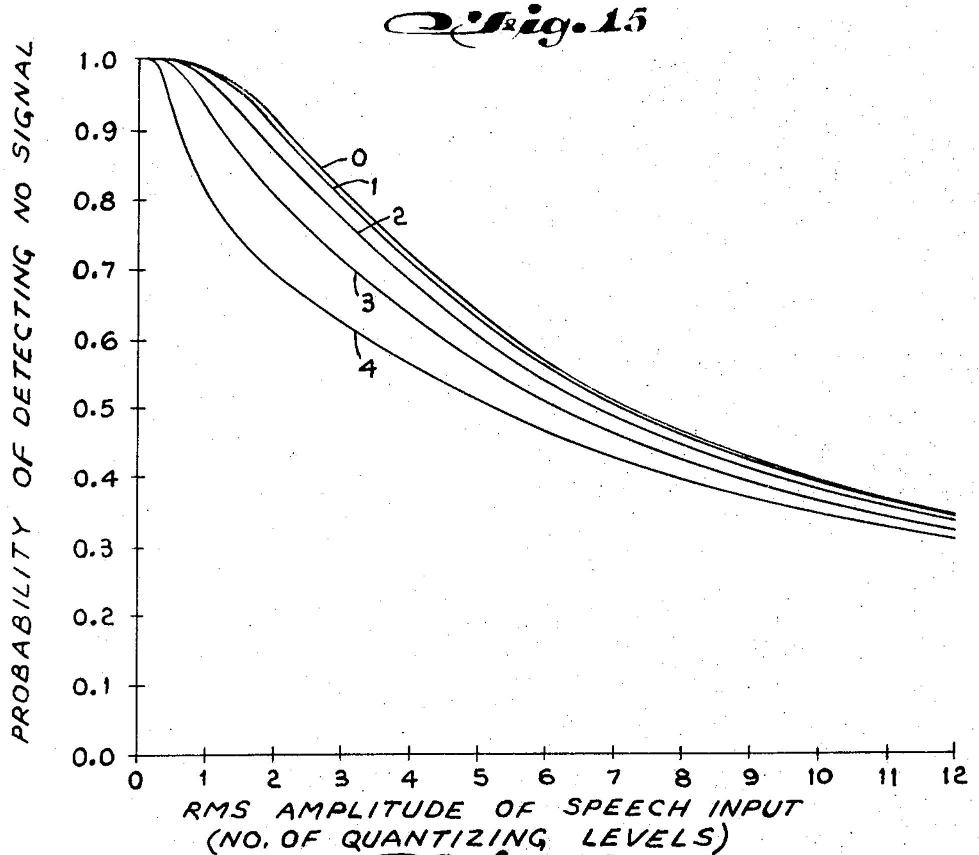
Figure 16:
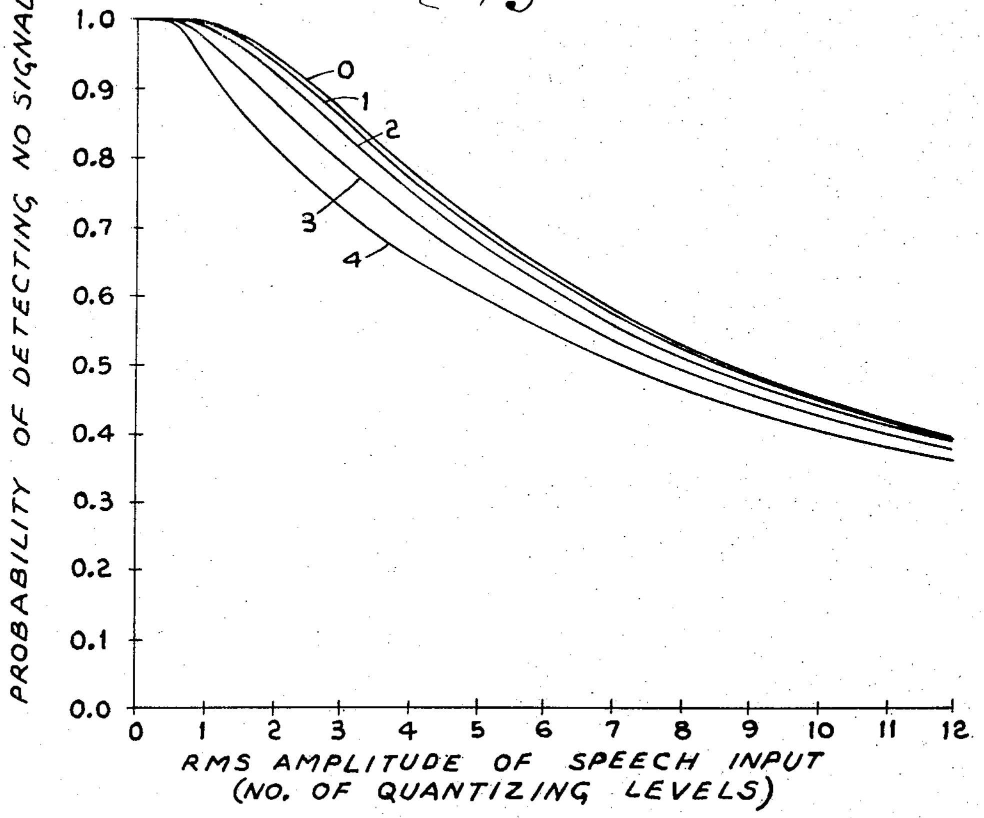

FIGS. 11 through 16 illustrate the curves for the probability $P_2$ for the case of speech input for various values of offset M and threshold ±t. FIG. 11 illustrates the curves of probability $P_2$ for offsets of 0, 1 and 2 levels with a threshold of ±1 levels. FIG. 12 illustrates the curves of probability $P_2$ for offsets of 0, 1 and 2 levels with a threshold of ±2 levels. FIG. 13 illustrates the curves of the probability $P_2$ for offsets of 0, 1, 2 and 3 levels with a threshold of ±3 levels. FIG. 14 illustrates the curves of the probability of $P_2$ for offsets of 0, 1, 2, 3 and 4 levels with a threshold of ±4 levels. FIG. 15 illustrates the curves of the probability of $P_2$ for offsets of 0, 1, 2, 3 and 4 levels with a threshold of ±5 levels. FIG. 16 illustrates the curves of probability $P_2$ for offsets 0, 1, 2, 3 and 4 levels with a threshold of ±6 levels.

These graphs of FIGS. 5–16 show several general characteristics, as well as specific numerical information. For example, it is apparent that when the offset is too large, the response is entirely wrong for small signals. The response changes more rapidly for high probabilities on small signals. The response to speech is smoother than in the sinusoidal case. This latter is a result of the change of slopes in FIG. 4. The response to speech is also less sensitive to offset, especially for small signals, where the effect of offset is greatest.

A simplified form of the second part of the speech detector is an up/down counter which counts down by $-d$ when the first part detects "no signal" and counts up by $+u$ when a signal is detected. Its average counting rate should be positive (up) for a strong signal and negative (down) for a weak signal or no signal. Further definition of thresholds and sampling rates will define the response-time characteristics of the speech detector. For now, the average counting rate only is assumed, which, for a sampling rate = 1 is $$R_n = u(1 - P_n) - d\,(P_n),$$

where $n$ is equal to 1 or 2.

It will be assumed that $n = 1$ to indicate the sinusoidal input case and $n = 2$ to indicate speech input with the assumed probability distribution.

When the probability $P_n$ of detecting no signal equals a certain value P*, the average counting rate $R_n$ will be zero, indicating an indecisive response. P* is the "threshold probability" or "probability threshold:"

$$P^* = u/(u + d) = 1/[1 + (d/u)]$$

Figure 17:
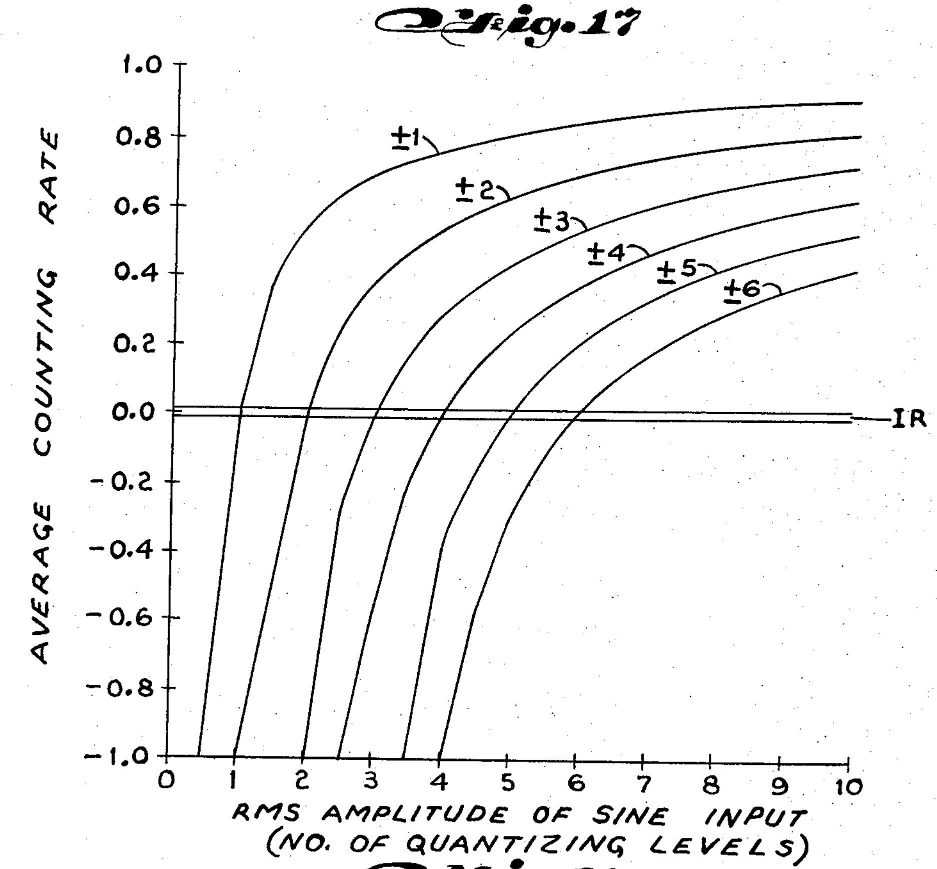
Figure 18:
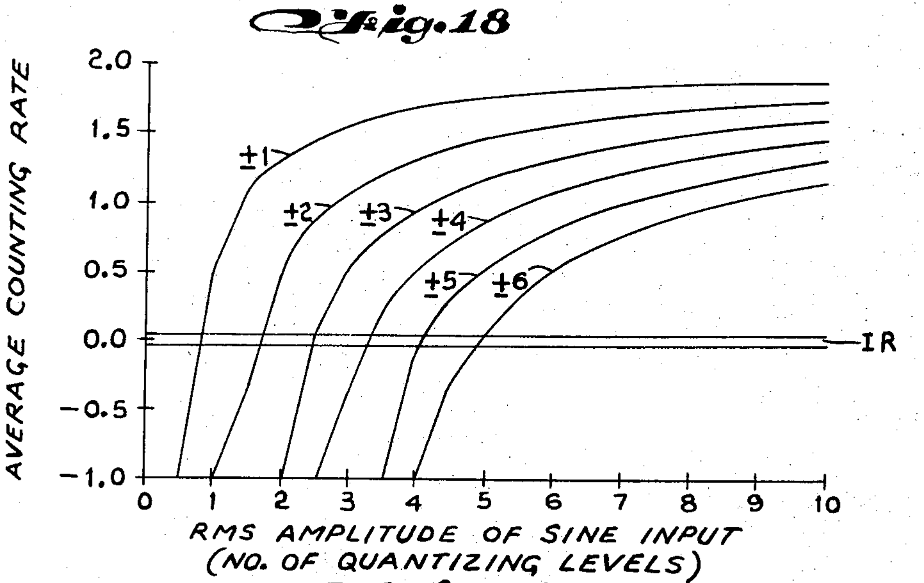
Figure 19:
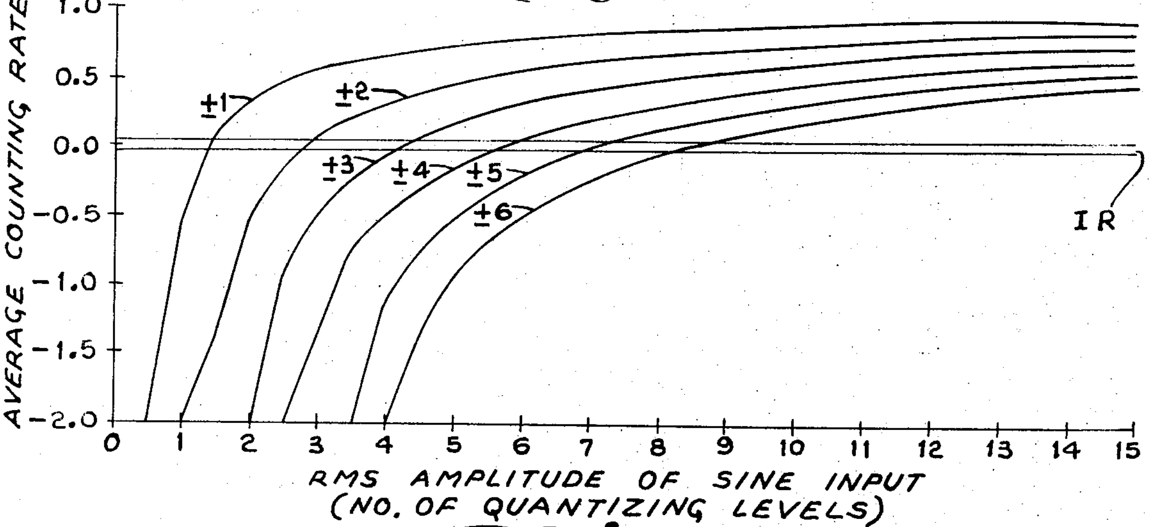

Notice that P* depends only on the up/down ratio. FIGS. 17, 18 and 19 illustrate curves of the normalized (for sampling rate = 1) average counting rate $R_1$ as a function of the rms amplitude of a sine input, and P* = ½, ⅔ and ⅓, using suitable small integers for $u$ and $d$. FIG. 17 illustrates the curves of the instantaneous thresholds = ±1, ±2, ±3, ±4, ±5 and ±6 for a probability threshold of ½, an offset of 0, up = 1 and down = −1. FIG. 18 illustrates the curves of the instantaneous thresholds equal to ±1, ±2, ±3, ±4, ±5, and ±6 for a probability threshold of ⅔, an offset of 0, up = 2 and down = −1. FIG. 19 illustrates the curves of the instantaneous thresholds ±1, ±2, ±3, ±4, ±5 and ±6 for a probability threshold of ⅓, an offset of 0, up = 1 and down =−2.

Figure 20:
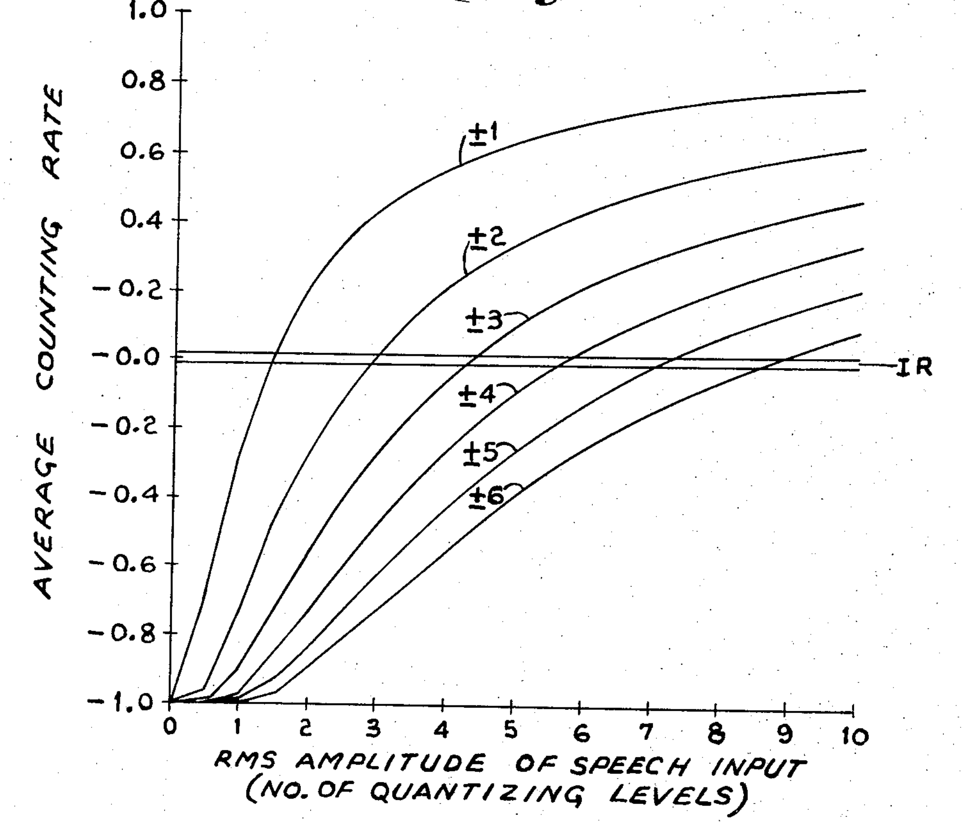
Figure 21:
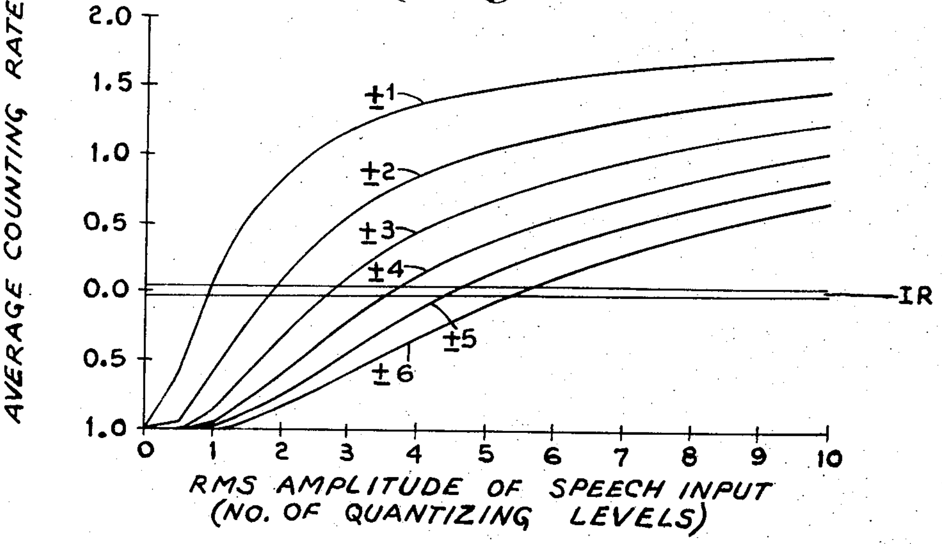
Figures 22, 23:
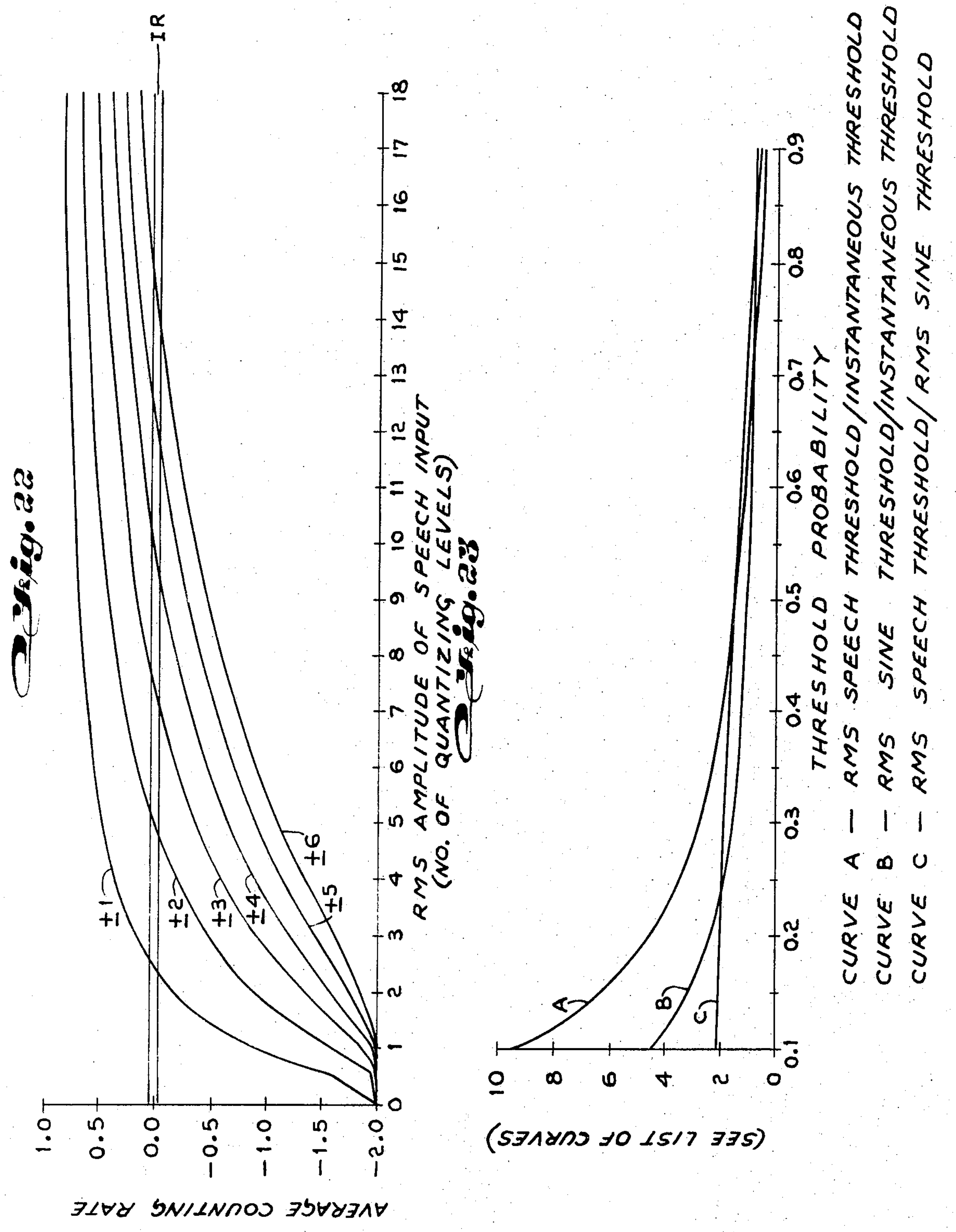

FIGS. 20, 21 and 22 are corresponding graphs for the normalized average counting rate $R_2$ for the case of speech input. FIG. 20 illustrates the curves of the instantaneous threshold equal to ±1, ±2, ±3, ±4, ±5 and ±6 for a probability threshold of ½, an offset of 0, up = 1 and down = −1. FIG. 21 illustrates the curves for the instantaneous threshold of ±1, ±2, ±3, ±4, ±5 and ±6 for a probability threshold of ⅔, an offset of 0, up = 2 and down = −1. FIG. 22 illustrates the curves of the instantaneous threshold of ±1, ±2, ±3, ±4, ±5 and ±6 for a probability threshold of ⅓, an offset of 0, up = 1 and down = −2. Notice that the response passes through the indecisive region IR (zero or small average counting rate) more quickly for a larger threshold probability and at a smaller rms amplitude.

Figure 24:
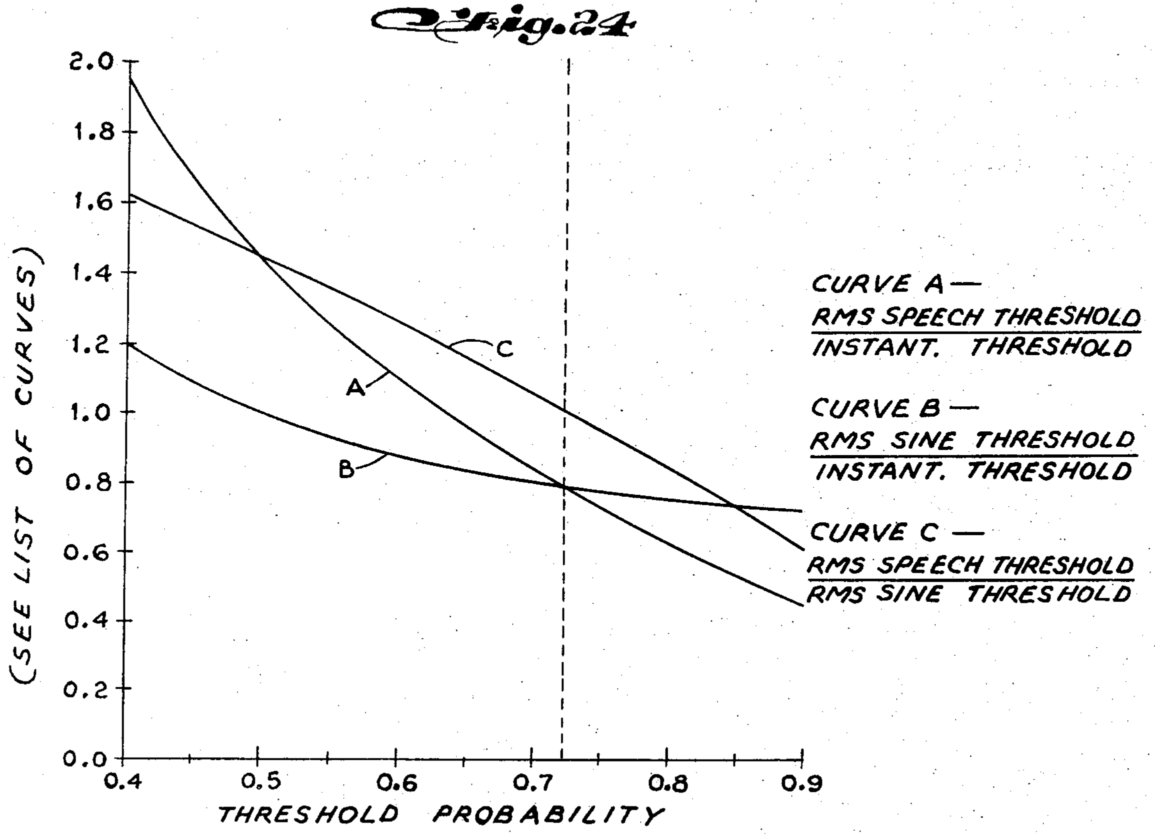

When the rms amplitude A equals a certain value $A_n$, the average counting rate $R_n$ will be zero (and also $P_n$ = P*). $A_n$ is called the rms threshold. The ratio of the rms threshold $A_n$ to the instantaneous threshold ±t depends on the probability threshold P* as shown by FIGS. 23 and 24 where $A_2/t$ (Curve A), $A_1/t$ (Curve B) and $A_2/A_1$ (Curve C) are plotted as functions of P*.

In accordance with the present invention an up/down counting circuit is used as an integrator for the second part of the speech detector. The count is increased by +u when the first part of the speech detector indicates "signal detected" for a speech sample outside of the instantaneous thresholds ±$t$. The count is decreased by −$d$ when the first part indicates "no signal detected" for a speech sample inside the instantaneous thresholds ±$t$. If after some time the net change of the count (the integration value) is positive (upward), then the fraction of the samples detected as "no signal" in that period of time is less than the threshold probability. However, if the change of count is negative (downward) then the fraction of the samples detected as "no signal" in that period of time is more than the threshold probability. Because the range of any counting is limited, the count is not allowed to move above some maximum count nor below some minimum count. An upward trend thus indicates the beginning of signal activity and a downward trend indicates the beginning of signal inactivity. However, the count may be moved up or down only one speech sample at a time. Requiring the second part of the speech detector to make a decision only after the count has moved some minimum distance will effectively require a minimum number of samples to be averaged for a given decision. Also, this will require more samples for a decision when the samples are not all the same than when all samples are alike, because the average rate of change of the counting circuit will be slower when there is a mixture of up and down counting. That is, when the input is somewhat ambiguous, more samples are averaged, and the reliability of the decision is improved.

The requirements for the speech detector response includes:

1. Minimum turn-on (operate) time (reaction to beginning of speech activity),
2. Minimum turn-off (release) time (reaction to beginning of speech inactivity), and
3. A longer turn-off time (deferred release) when the duration of speech activity exceeds a certain length of time.

The third requirement implies that the circuit must also perform as a timing counter for pulse width discrimination. With these general requirements and the preceding principles of operation in mind, a method of operation for the integrating counting circuit as proposed as illustrated in FIG. 25.

Figure 25:
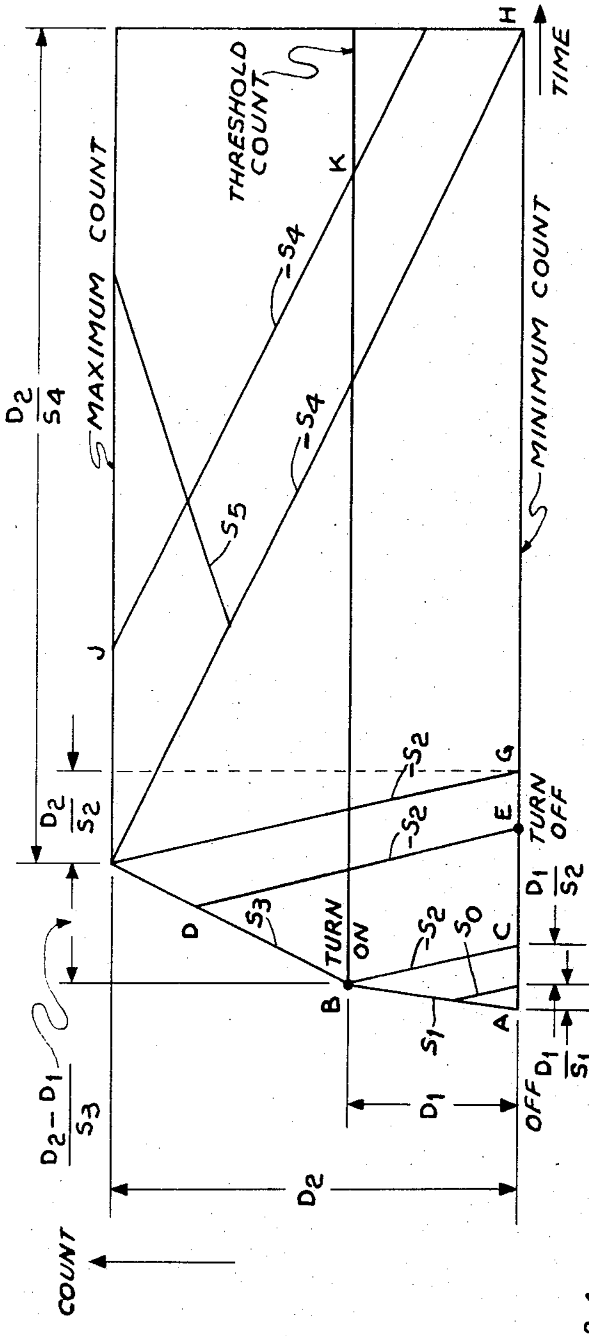

In FIG. 25, time is the horizontal coordinate, and count is the vertical coordinate. The minimum count is represented by the line ACEGH, and the maximum count by the line FJ. It is assumed that at point A, the speech channel, which has been inactive, begins to be active. It is also assumed, for simplicity, that all speech samples are outside the instantaneous thresholds when the speech channel is active, and all samples are inside the instantaneous thresholds when the channel is inactive. This situation produces maximum average counting rates.

When the channel becomes active, the count increases from A towards B at the slope $S_1$. When and if the threshold, represented by line BK, is reached, the output of the second part of the speech detector is turned "on," indicating a request for a TASI channel connection, and the upward slope is changed from $S_1$ to $S_3$. If the signal activity ceases before the threshold BK is reached, the count decreases at the slope $-S_0$. The turn-on delay depends on the distance $D_1$ to the threshold and on the slope $S_1$, and equals $D_1/S_1$.

If the signal activity ceases after the threshold BK is crossed and before the maximum count FJ is reached, such as at point D, the count decreases at a slope $-S_2$, as indicated by the line DE. When the minimum count ACEGH is reached, the output of the second part of the speech detector is turned "off" indicating no need for a TASI channel. The turn-off delay depends on the duration of signal activity. The line BC shows the case where signal activity ceases immediately after the threshold BK is crossed, and the line FG shows the case where activity ceases immediately before the maximum count is reached. These two extremes are represented by points B and C in FIG. 26, which shows the variation of turn-off delay as a function of pulse width (duration of signal activity).

When the maximum count FJ in FIG. 25 is reached, the upward slope is changed to $S_5$ and the downward slope to $-S_4$ until the minimum count is reached. When the minimum count is reached, the slope $-S_0$ and $S_1$ are used again as before. The line FH represents the case where signal activity ceases immediately after the maximum count is reached, and line JK represents the path for a typical longer period of speech activity. The slope $S_4$ and $S_5$ are made smaller than the previous slopes $S_2$ and $S_3$ to increase the turn-off delay. The distance GH in FIG. 25 and the distance CD in FIG. 26 indicates the sudden increase in turn-off delay that occurs when the duration of activity (pulse width) becomes long enough to allow the maximum count to be reached. Because the maximum count cannot be exceeded, the turn-off delay remains constant for longer pulse widths.

In summary, there are three modes of operation of the integrating counting circuit as follows: Mode 1 starts when the minimum count is first reached. Mode 2 starts when the count first exceeds the threshold which is $R_1$ counts above the minimum count. Mode 3 starts when the maximum count ($R_2$ counts above the minimum count) is first reached. The slopes of these modes are as illustrated in FIG. 25 and are set forth in the following TABLE I.

TABLE I

| Mode | Down | Up |
|---|---|---|
| 1 | $-S_0$ | $S_1$ |
| 2 | $-S_2$ | $S_3$ |
| 3 | $-S_4$ | $S_5$ |

Mode 1 indicates that no TASI channel is needed. Mode 2 or 3 indicates that a connection to a TASI channel is required. In addition, mode 3 indicates that the duration of signal activity has been long enough to require the longer turn-off delay.

Figure 26:
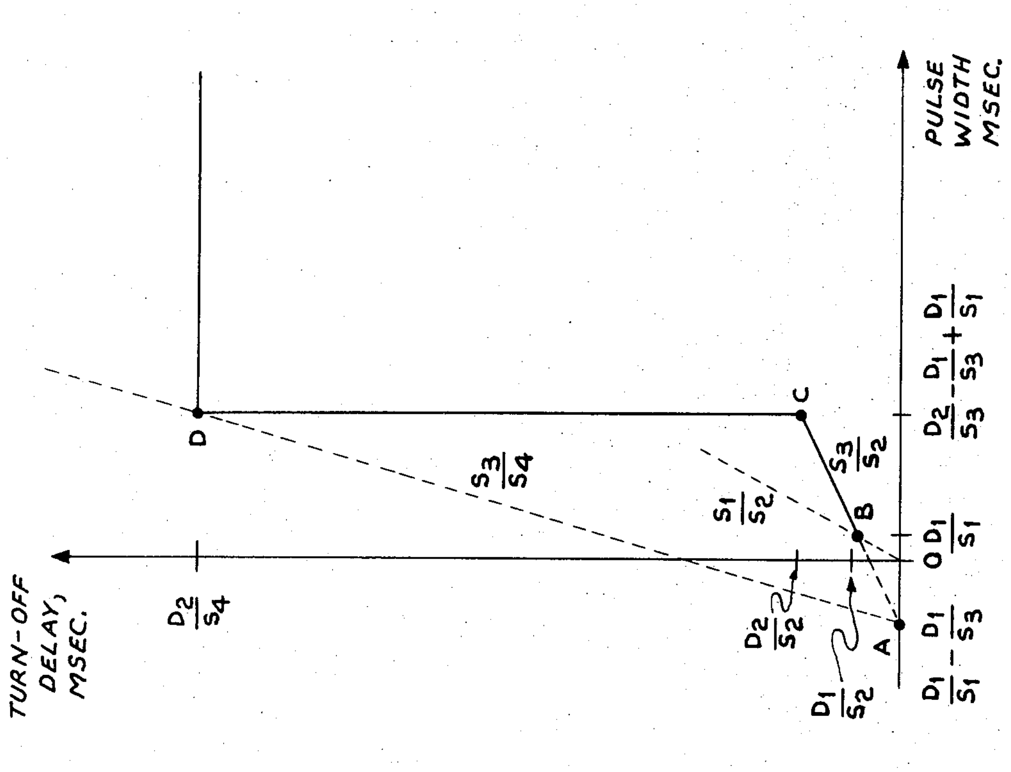

FIG. 26 shows how the turn-off delay vs. pulse width depends on the slopes $S_1$, $S_2$, $S_3$ and $S_4$ and the count distances $D_1$ and $D_2$. The lines AD, ABC and OB in FIG. 26 have slopes $S_3/S_4$, $S_3/S_2$ and $S_1/S_2$, respectively. For fixed slopes and variable distances $D_1$ and $D_2$, the angles in this diagram are fixed, and points B and D may move only along the broken lines shown. $D_1$ determines the size of triangle ABO, and distance $D_2$ determines the size of triangle ADC.

Figure 27:
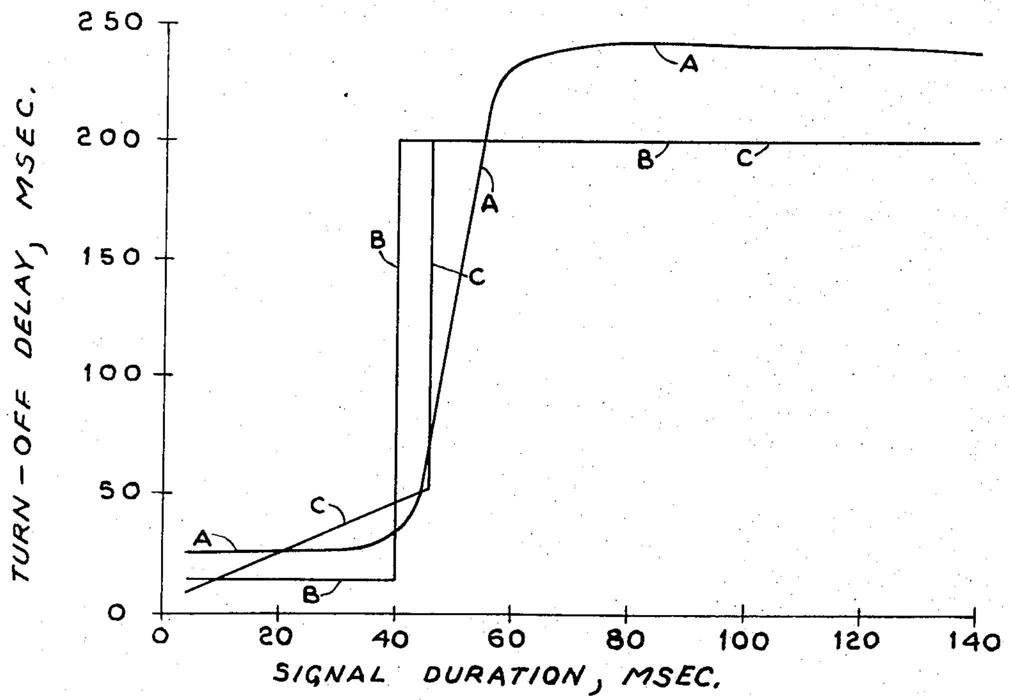
FIG. 27 is a graph of turn-off delay versus signal duration comparing the operation of the speech detector in accordance with the principles of the present invention with two known prior art speech detectors employed in TASI communication systems.

FIG. 27 compares the response of FIG. 26, for certain parameters with the responses of two other known circuits. Curve A is the response of a Bell Telephone Laboratory circuit as described in the Bell System Technical Journal of July 1962. Curve B is the response to a circuit employed by the KoKusal Denshin Denwa Company, Limited (Japan), as described by a CCITT (International Telegraph and Telephone Consultive Committee) document of November 1969. Curve C is the response of the circuit disclosed herein with any one of the sets a, b and c of parameters given in TABLE II hereinbelow.

TABLE II

| | a | b | c |
|---|---|---|---|
| (mode 3) $S_4$ = | 8000 | 2000 | 500 |
| (mode 2) $S_2 = S_3$ = | 32000 | 8000 | 2000 |
| (mode 1) $S_1$ = | 128000 | 32000 | 8000 |
| $D_1$ = | 512 | 128 | 32 |
| $D_2$ = | 1600 | 400 | 100 |

The following paragraphs will explain the choice of these parameters.

From FIG. 24, it is evident that the rms threshold to the instantaneous threshold depends on the threshold probability, which is a function of the up/down ratio of the integrating counting circuit. In order to keep the rms threshold constant, the up/down ratio should therefore be the same for all three modes of operation of the integrating counting circuit. That is, $$S_1/S_0 = S_3/S_2 = S_5/S_4 = u/d.$$

As indicated by FIGS. 26 and 27, portion BC in FIG. 26 of the turn-off delay curve will match Curves A and B of FIG. 27 more closely if the slope $S_3/S_2$ which equals the up/down ratio $u/d$ is close to zero, or at least small. But this will make the threshold probability P*, which equals $u/(u+d)$, also small. As indicated by FIG. 23, for small threshold probability, the rms threshold is significantly greater than the instantaneous threshold, especially for the case of speech input. Comparison of FIG. 22 (low probability threshold = ⅓) with FIG. 21 (high probability threshold = ⅔) shows that a smaller threshold probability yields a smaller number of rms thresholds that can be obtained within a given range (such as from 1 to 6 levels) for integer values of the instantaneous threshold. An up/down ratio of one, which gives a threshold probability of ½, appears to be a good compromise between these conflicting considerations, and also has the advantage of simplicity of logic implementation. Thus, $S_1/S_0 = S_3/S_2 = S_5/S_4 = u/d = 1$.

Also for simplicity of logic implementation, it is preferred that $S_1/S_2$ and $S_3/S_4$ be equal to integer powers of two. With this in mind, the following values for the parameters shown in FIG. 26 are chosen to obtain a good match to Curves A and B of FIG. 27.

$D_1/S_1$ = 4 msec, $D_2/S_2$ = 50 msec,
$D_1/S_2$ = 16 msec, $D_2/S_4$ = 200 msec,
$D_1/S_3$ = 8 msec, $D_2/S_3$ = 50 msec,
$D_2/S_3 - D_1/S_3 + D_2/S_1$ = 46 msec.

These figures imply that:

$$S_1/S_2 = S_3/S_4 = 4.$$

An interpretation of this is that the three modes of operation of the integrating counting circuit have "time constants" that differ by the ratio of 4 to 1 as set forth in the following TABLE III.

TABLE III

| Mode | 1 | 2 | 3 |
|---|---|---|---|
| Time Constant | T | 4T | 16T |

The different "time constants," or rates of integration (counting rates) depend on the slopes, which each depend on the sampling rate and the size of the change of count per sample. Since the rate of available speech samples is 8000 per second (per speech channel), it would be convenient if the slope used for one of the three modes is 8000 counts/second. For column *a* of Table II, this slope is used for mode 3, for column *b*, it is used for mode 2, and for column *c* it is used for mode 1. The slopes given in column a can be obtained by using 8000 samples/second for all three modes (using all samples available), counting by 16's (adding ±16) in mode 1, counting by 4's in mode 2, and counting by 1's in mode 3. The slopes given in column *c* can be obtained by counting by 1's for all three modes, using 8000 samples/second for mode 1, 2000 samples/second (¼ of those available) for mode 2 and 500 samples/-second for mode 3. For column *b*, a mixture of both techniques can be used.

For the parameters given in column *a* in TABLE II, an 11-bit counter having 2048 states is required. However, a 9-bit counter is needed for column *b*, and a 7-bit counter for column *c*. Since a count must be stored for each of the 48 speech channels, 48 times 4 or 192 less bits are needed for the column *c* parameters than for column *a* parameters.

However, not all available samples are used for the *b* and *c* schemes. For column *c*, the sample read out is 500 samples/seconds. For a sine wave with a frequency which is an integer multiple of 500 Hz (hertz) (there are several of these frequencies in the speech band), and for equally spaced samples, it is possible that the samples will include only zero crossings of the signal, thus yielding a false detection of a "no signal" or "inactive" condition. Accounting for the probability threshold, false detections can also occur, generally intermittently, for frequencies and phases close to the above situation.

If, however, sampling at a rate *f* occurs randomly at N equally-spaced phases, each phase occuring equally as often, this sampling will be equivalent to sampling at the rate of Nf with one phase. By equivalent, it is meant that for sampling a periodic signal with a frequency less than N*f*/2, the probability distributions of the samples will be the same. Thus, for the scheme of column c there can be used the frequencies and number of phases given in TABLE IV presented hereinbelow.

TABLE IV

| Code A | Code B | Mode | Clocks Used | Frequency | No. Of Phases |
|---|---|---|---|---|---|
| 0 | X | 1 | CLK 1 | 8 KHz | 1 |
| 1 | 0 | 2 | CLK 2 | 2 KHz | 4 |
| 1 | 1 | 3 | CLK 3 | 500 Hz | 16 |

Figures 34, 35:
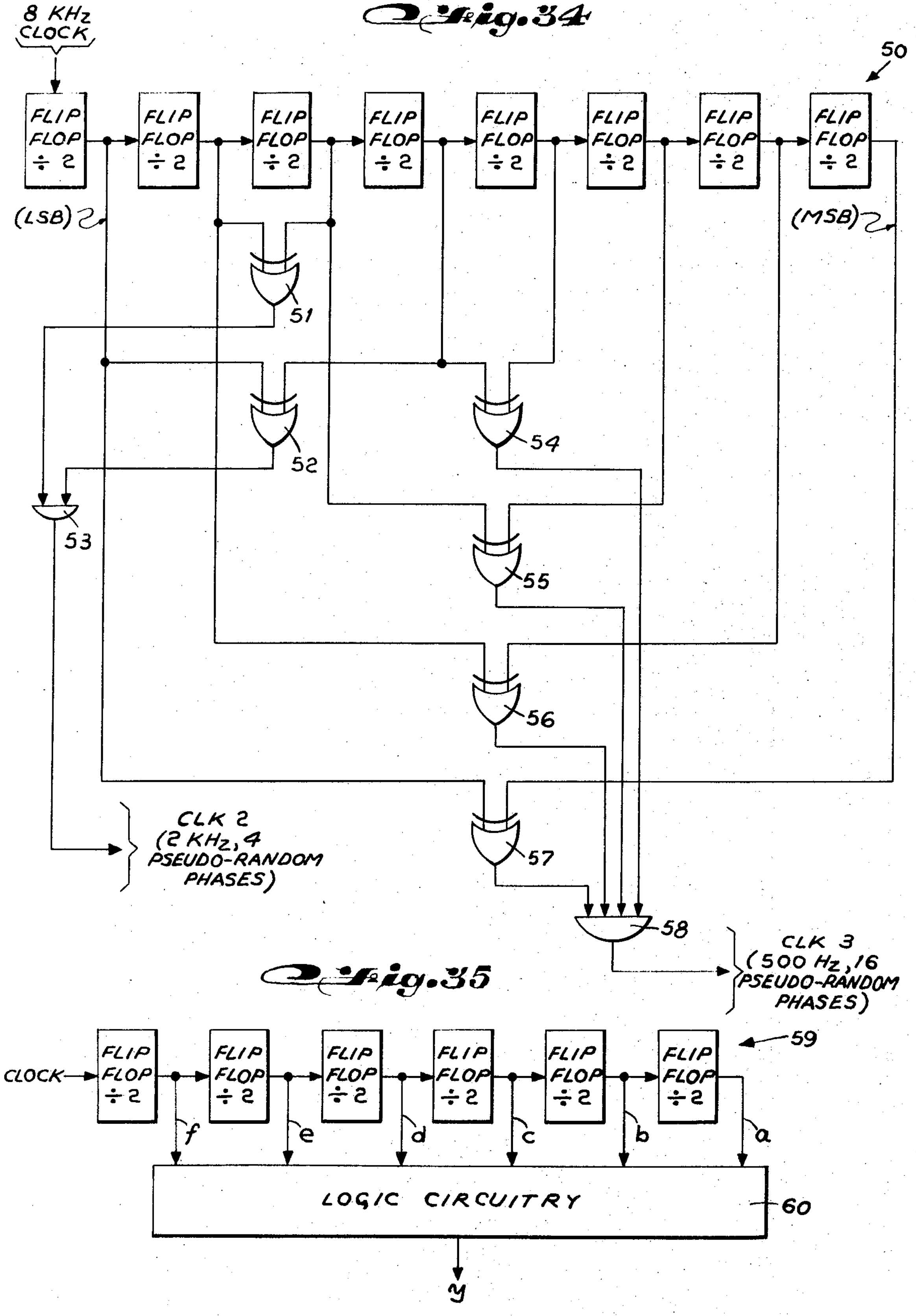
FIG. 34 is a logic diagram of the clock generator of FIG. 30.
FIG. 35 is a block diagram useful in explaining the operation of the logic diagram of FIG. 34.
Figure 36:
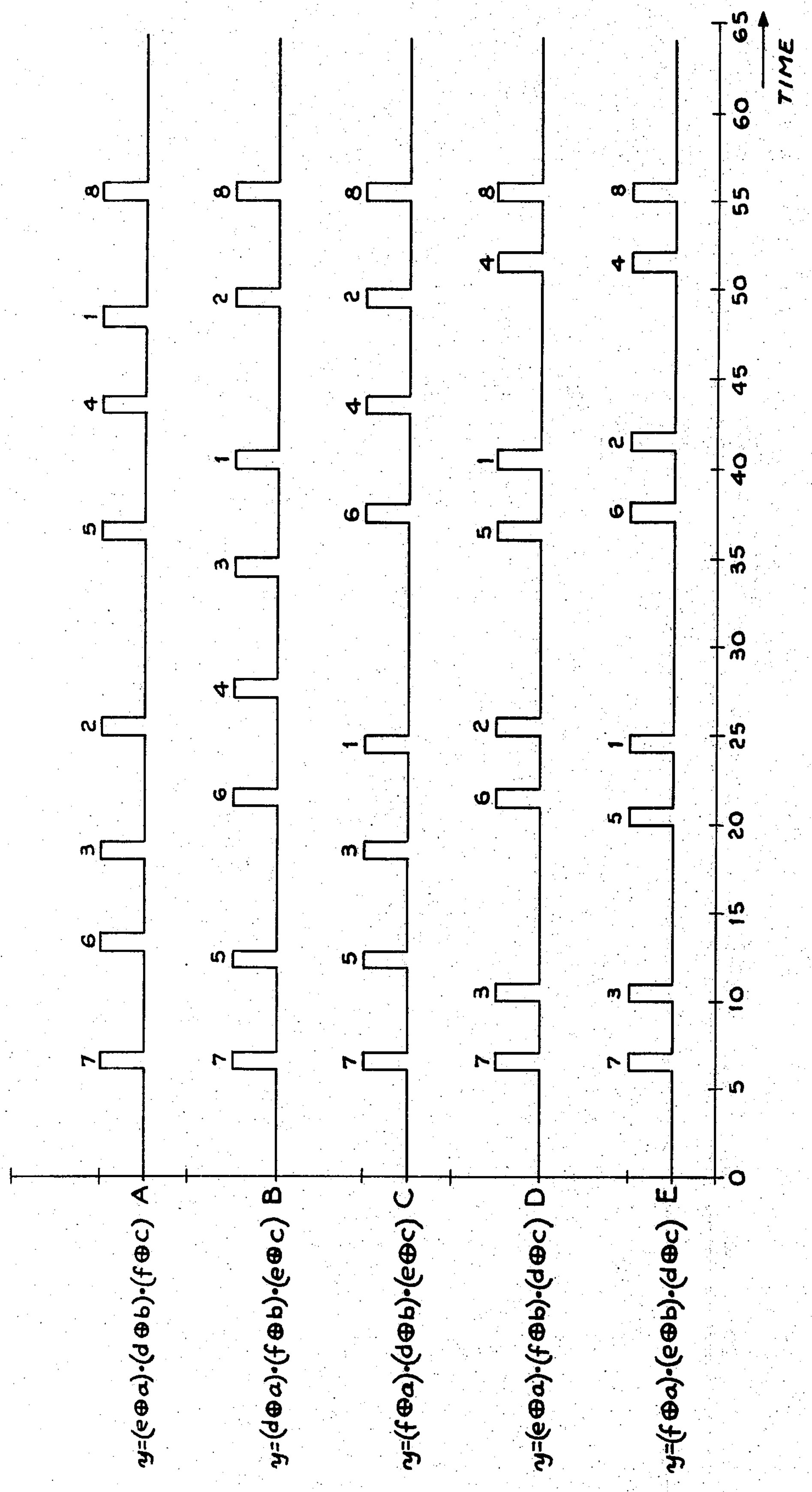
FIG. 36 is a timing diagram illustrating the various phases of clock signals produced at the output of the logic circuitry of FIG. 35 and their associated logic equations defining the logic circuitry employed in the logic circuitry of FIG. 35.

A simple means of generating the required sampling clocks with pseudo-random phases is shown in FIG. 34 which will be described hereinbelow. Some logic variations of the scheme are illustrated in FIGS. 35 and 36 to be described hereinbelow. The pseudo-random sampling is "truly" random sampling except for certain non-sinusoidal periodic signals having a frequency which is an integer sub-multiple of *f*/N, and which in effect match the pseudo-random pattern. Such signals would rarely occur in practice. The 8-bit counter and logic required for the scheme of column c is obviously less expensive than the 196 additional bits of memory required for the scheme of column *a*.

Figure 29:
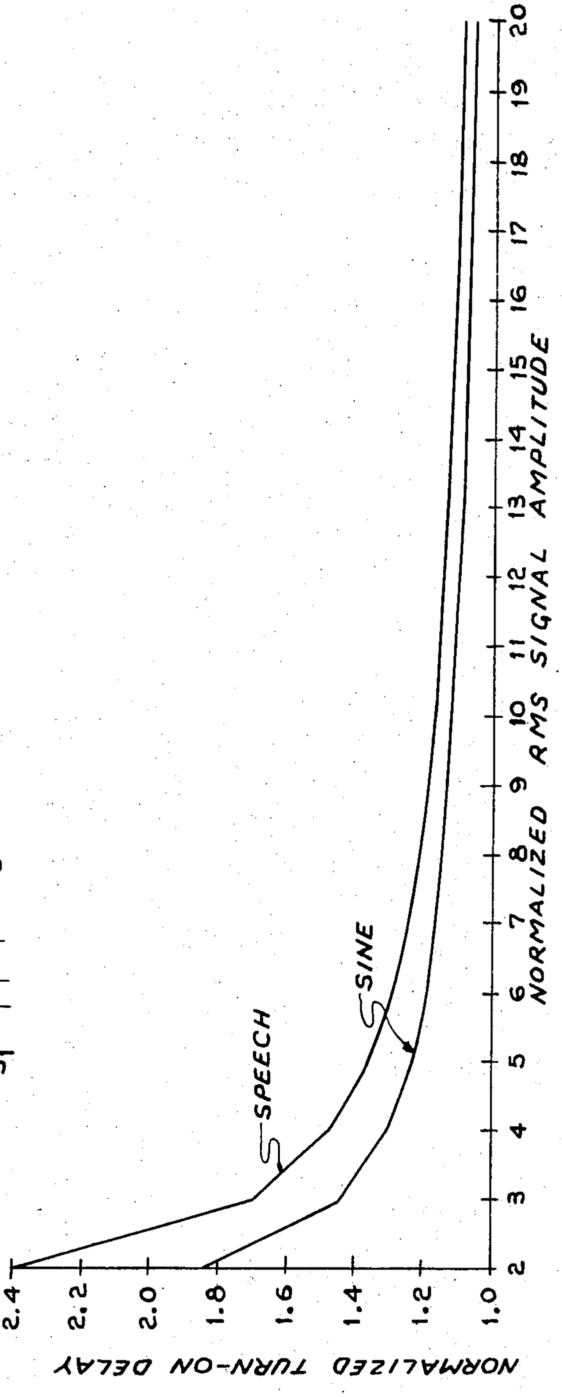
FIGS. 28 and 29 are graphs of turn-off delay versus signal amplitude in accordance with the principles of the present invention for two conditions of a sine and speech waveform.
Figure 28:
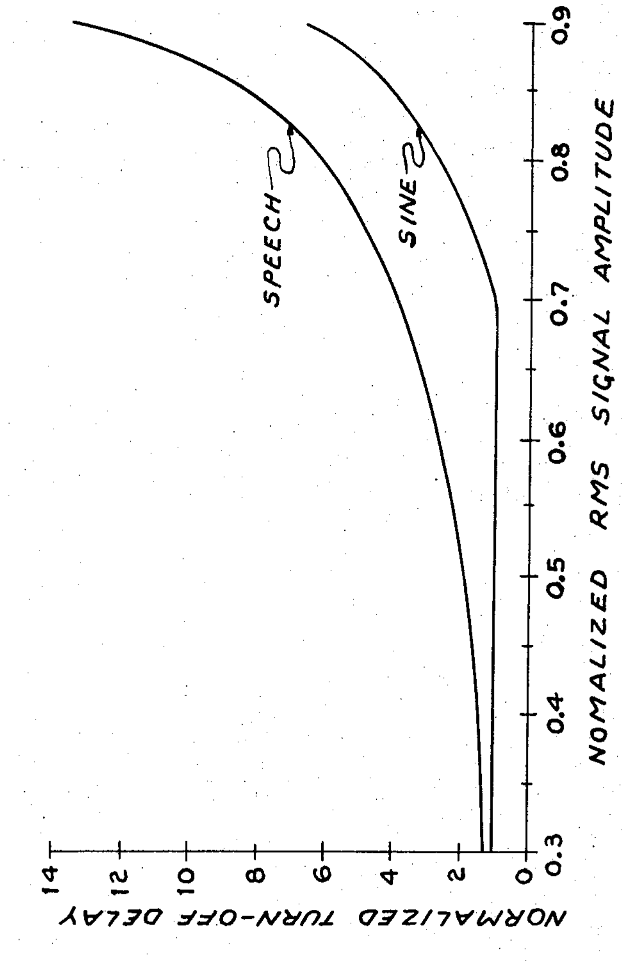

The timing analysis of the integrating counting circuit has been based on the concept that an "inactive" signal will always produce a "down" output from the first part of the speech detector, and an "active" signal will always produce an "up" output. This kind of response would actually be obtained for square pulse signals, but for sinusoidal test tones and for speech, the response times will in general be slower. This is because an "active" signal will sometimes include samples between the instantaneous thresholds, and an "inactive" signal will sometimes include samples outside the instantaneous thresholds. The turn-on and turn-off delays will thus be generally larger than the minimum values assumed in FIGS. 25, 26 and 27, depending on the rms signal amplitude. In FIGS. 28 and 29, the normalized turn-off delay is plotted as a function of normalized rms signal amplitude for both sine and speech inputs. In both FIGS. 28 and 29, the vertical coordinate is average delay divided by the minimum delay, and the horizontal coordinate is the rms signal amplitude divided by the rms threshold value. These signals show that the speech detector will respond more slowly to changes of speech activity than test-tone (sine) activity, especially when the rms signal amplitude is near the rms threshold. These figures also show that the average delay will almost equal the minimum delay when the rms signal amplitude is far from the rms threshold.

Figure 30:
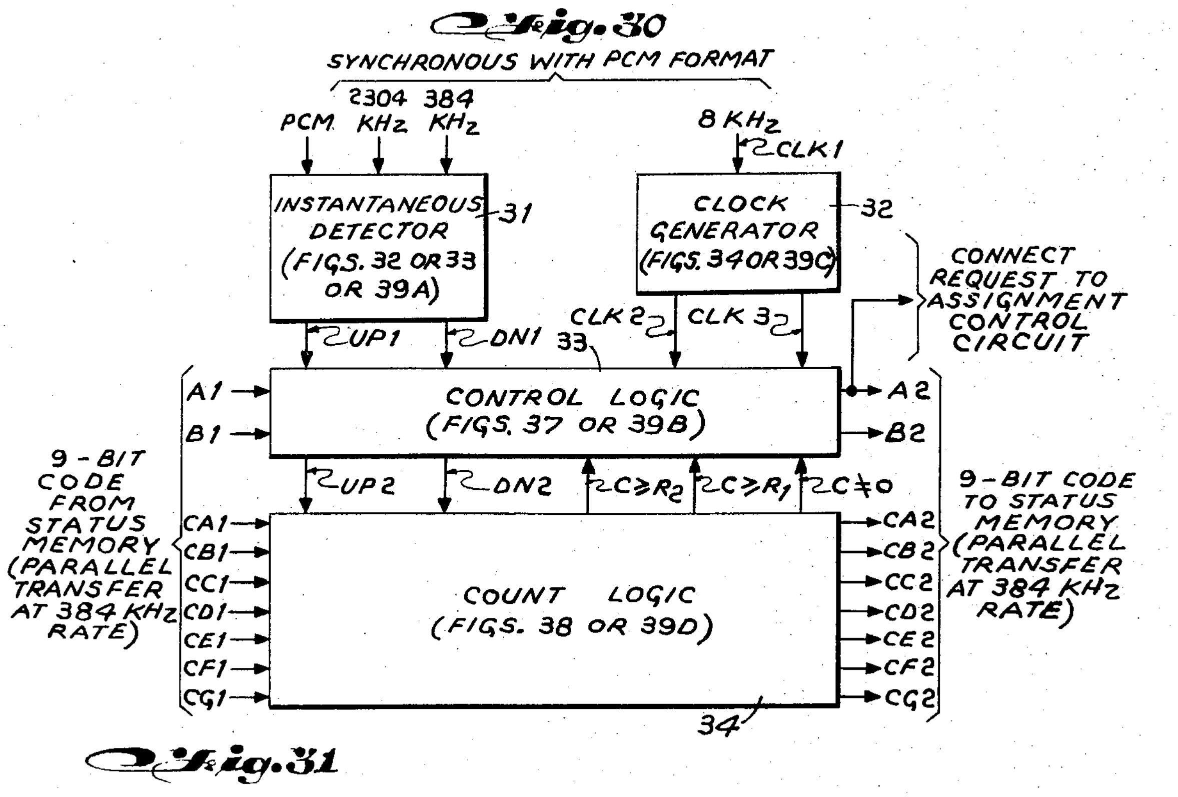
FIG. 30 is a block diagram of the speech detector of FIG. 2 in accordance with the principles of the present invention.
Figure 31:
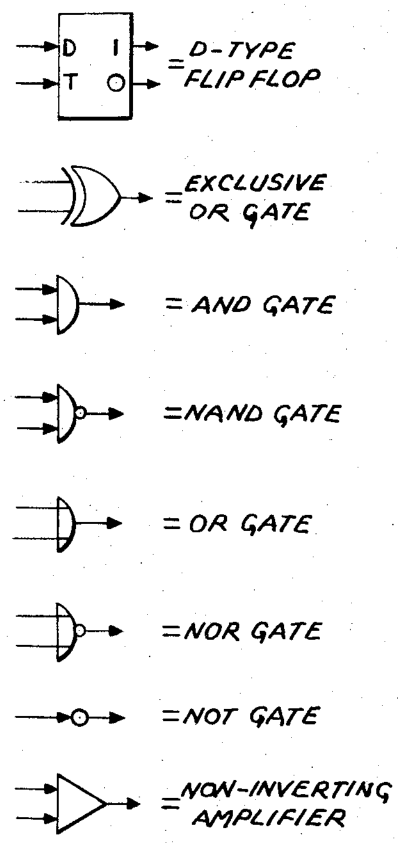
FIG. 31 defines the logic symbols employed in FIGS. 32–34 and 37–39.

FIG. 30 is a general block diagram of the digital speech detector in accordance with the principles of the present invention having the characteristics hereinabove described. The speech detector includes an instantaneous detector 31 as the first part of the speech detector and a clock generator 32, control logic 33 and count logic 34 as the second part of the speech detector.

TABLE IV presented hereinabove and TABLES V-VII presented hereinbelow summarize the coding and operation of the integrating counting circuit, namely, generator 32, control logic 33 and count logic 34.

TABLE V

| Count Condition | UP1 | DN1 | UP2 | DN2 |
|---|---|---|---|---|
| C   R2 | 1 | 0 | 0 | 0 |
| C   R2 | 0 | 1 | 0 | 1 |
| 0<C<R2 | 1 | 0 | 1 | 0 |
| 0<C<R2 | 0 | 1 | 0 | 1 |
| C = 0 | 1 | 0 | 1 | 0 |
| C = 0 | 0 | 1 | 0 | 0 |

TABLE VI

| UP2 | DN2 | increment | code |
|---|---|---|---|
| 1 | 0 | +1 | 0 0 0 0 0 0 1 |
| 0 | 0 | 0 | 0 0 0 0 0 0 0 |
| 0 | 1 | −1 | 1 1 1 1 1 1 1 |

TABLE VII

| Count Condition | Present Mode | Next Mode |
|---|---|---|
| C   R2 | M | 3 |
| | 1 | 2 |
| R1   C<R2 | 2 | 2 |
| | 3 | 3 |
| 0 <C<R1 | M | M |
| C = 0 | M | 1 |

Figure 32:
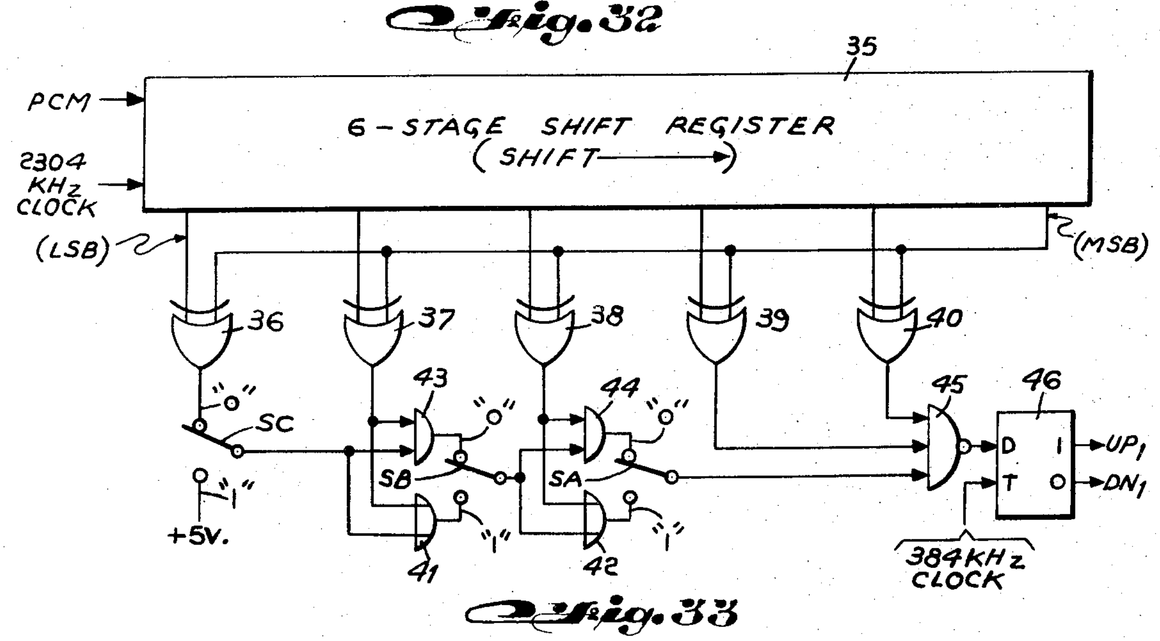
FIG. 32 is a logic diagram of one form of the instantaneous detector of FIG. 30.

Referring to FIG. 32 there is disclosed therein one form of instantaneous detector 31. The instantaneous detector accepts the 2304 kb/sec (kilobit per second) PCM signal and shifts it through a 6-bit shift register 35 with a 2304 KHz (kilohertz) clock. Instantaneous comparison with an instantaneous threshold set by three switches SA, SB and SC are performed by the EXCLUSIVE OR gates 36–40, OR gates 41 and 42, AND gates 43, 44 and NAND gate 45. The resultant output of NAND gate 45 is retimed at the 384 KHz word rate, which must be synchronized to the PCM framing, in the D type flip flop 46 which produces a high UP1 signal when the detected normalized amplitude is greater than a first threshold value and less than a second threshold value different than the first threshold value and a DN1 signal when a detected normalized amplitude is between the first and second threshold values.

The threshold coding is presented in TABLE VIII hereinbelow.

TABLE VIII

| Instantaneous Threshold | Switches SA | SB | SC | Code Range R3 | R4 |
|---|---|---|---|---|---|
| 1 | 0 | 0 | 0 | 31 | 32 |
| 2 | 0 | 0 | 1 | 30 | 33 |
| 3 | 0 | 1 | 0 | 29 | 34 |
| 4 | 0 | 1 | 1 | 28 | 35 |
| 5 | 1 | 0 | 0 | 27 | 36 |
| 6 | 1 | 0 | 1 | 26 | 37 |
| 7 | 1 | 1 | 0 | 25 | 38 |
| 8 | 1 | 1 | 1 | 24 | 39 |

The instantaneous threshold value is normally two levels, or −38 dmbO, but can be varied from one level (−44 dbmO) to eight levels (−26 dmbO). These figures assume that the clipping level is +2 dbmO.

Figure 33:
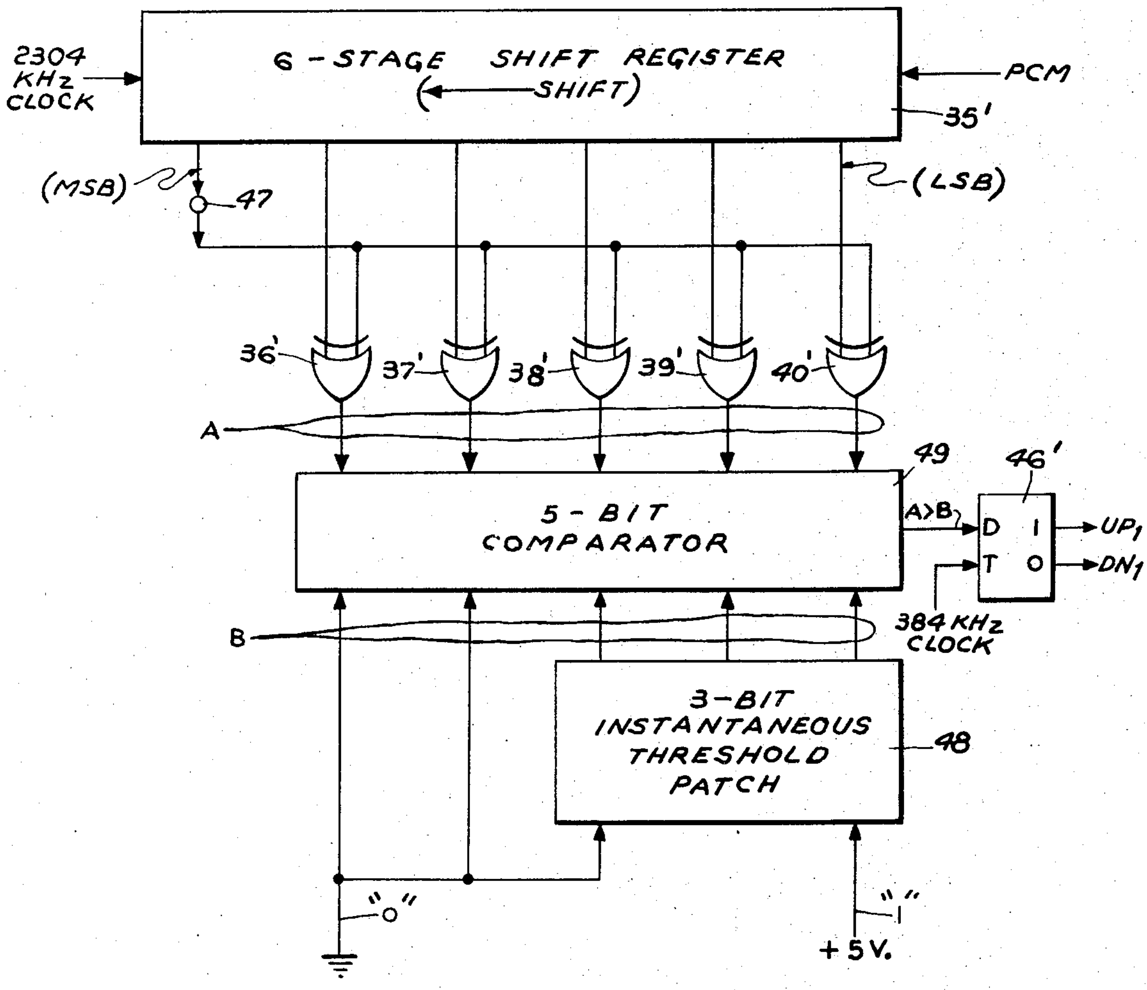
FIG. 33 is a logic diagram of still another embodiment of the instantaneous detector of FIG. 30.

Referring to FIG. 33 another form of instantaneous detector is illustrated which includes a six stage shift register 35' operating as described in FIG. 32. EXCLUSIVE OR gates 36'–40' compare the state of the second through sixth stages of shift register 35' with the output of NOT gate 47 which is coupled to the first stage of register 35'. Thus, the comparison is performed with the inverted version of the last significant bit (LSB) rather than comparison with the most significant bit (MSB) as illustrated in FIG. 32. The instantaneous threshold level is provided by instantaneous threshold patch 48 and is coupled together with the outputs of the EXCLUSIVE OR gates to the 5-bit digital amplitude comparator 49 to provide the input for the retiming flip flop 46' which functions as described hereinabove with respect to FIG. 32. The patch 48 provides the same threshold codes as indicated in TABLE VIII hereinabove.

The clock generator 32 of the second part of the speech detector of FIG. 30 is illustrated in FIG. 34 and includes an 8-bit divide-by-256 counter 50 and two equality comparator circuits. One of the comparator circuits includes EXCLUSIVE OR gates 51 and 52 and AND gate 53. The other comparator circuit includes EXCLUSIVE OR gates 54–57 and AND gate 58. This arrangement generates 2 KHz and 500 Hz clocks with random phases for sampling the output of the instantaneous detector 31 of FIG. 30. Signal CLK 2 produced by the first comparator circuit has a pulse whenever the first two bits of the counter are the complement (opposite value) of the next two bits in reverse order. This signal has pulses at a 2 KHz rate, but the pulses are not equally spaced, because they occur at four different phases in a pseudo-random sequence. Similarly CLK 3 produced by the second comparator circuit is generated by comparing the first four bits of the counter with the next four bits. Signal CLK 3 has pulses at a 500 Hz rate, occurring at 16 pseudo-random phases.

To more fully illustrate the operation of the circuit of FIG. 34, there is disclosed herein FIG. 35 and the associated timing diagram of FIG. 36 with the counter 59 being a 6-bit counter counting at the sampling rate of 1 KHz with outputs from the various flip flop stages of counter 59 being coupled to logic circuitry 60. The legends in FIG. 36 are the logic equations y that define the generated clock with six pseudo-random phases. The logic equations indicate the logic components of logic circuitry 60 as well as the resultant output signal y therefrom.

Figure 37:
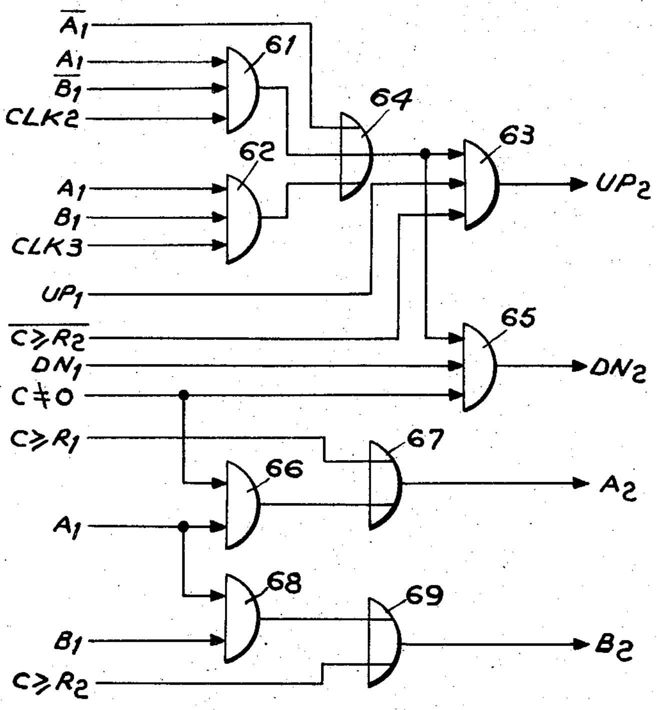
FIG. 37 is a basic logic diagram of the control logic of FIG. 30.

FIG. 37 illustrates one form of logic circuitry that can be employed as the control logic 33 of FIG. 30. The AND gates 61–63 and OR gate 64 produces the UP2 output to count logic 34 of FIG. 30 while AND gates 61, 62 and 65 and OR gate 64 produce the DN 2 output to count logic 34 of FIG. 3. The AND gate 66 and OR gate 67 produce the A2 output of control logic 33 while AND gate 68 and OR gate 69 produce the B2 output of control logic 33 of FIG. 30.

Figure 38:
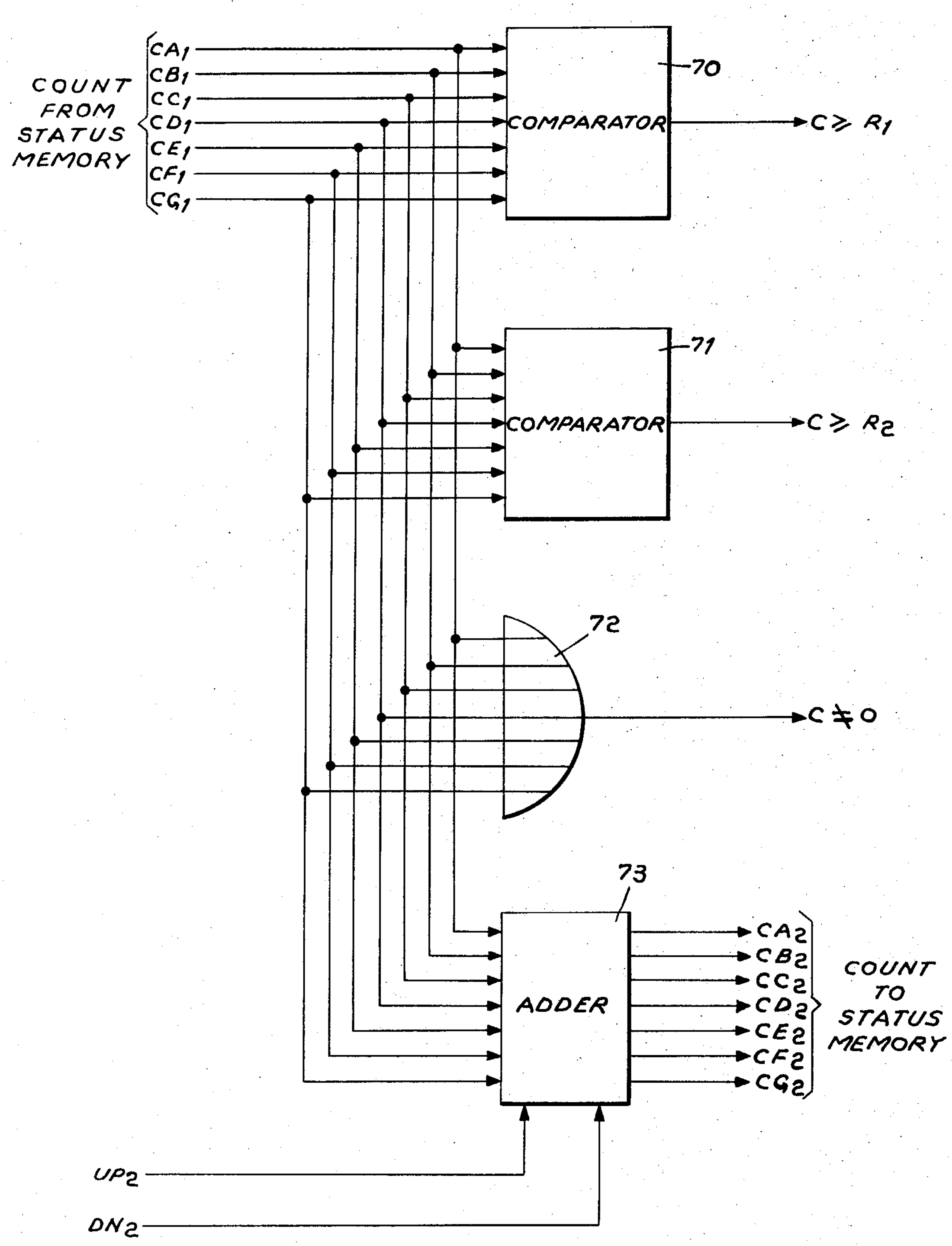
FIG. 38 is a basic logic of the count logic of FIG. 30.

FIG. 38 illustrates the basic building blocks of the logic circuitry for the count logic 34 of FIG. 30. The count logic employs two comparators 70 and 71 to determine if the count from the status memory is greater than or equal to the count $R_1$ and whether the count is equal to or greater than the count $R_2$. In addition, OR gate 72 provides an output when the count is not equal to 0. The adder 73 responding to the UP2 and DN2 signals from the control logic 33 of FIG. 37 provides the count to be returned to the status memory, this latter count including the change in the value of integration.

Figures 39A, 39E:
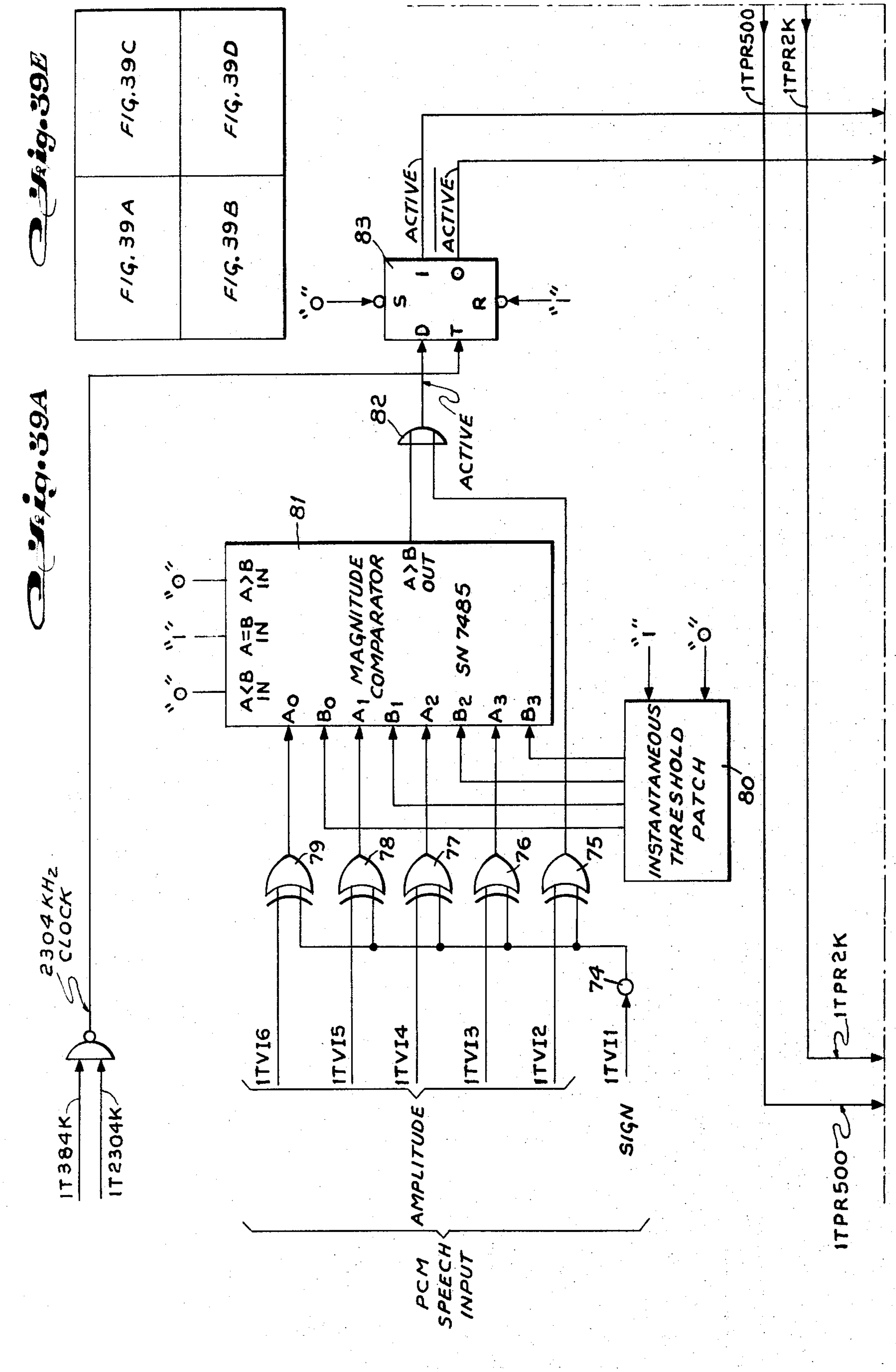
FIGS. 39A–39D, when organized as illustrated in FIG. 39E, illustrates the logic diagram of a reduction to practice of the speech detector in accordance with the principles of the present invention.

Referring to FIGS. 39A–39D, when organized as illustrated in FIG. 39E, there is illustrated therein the logic diagram of a reduction to practice of the digital speech detector in accordance with the principles of the present invention. It will be noted that certain of the blocks of FIGS. 39A–39D contain therein a numeral prefixed by the letters SN. These are the model numbers of integrated circuit components that can be bought from Texas Instruments, Inc. and are fully described in their handbook "Integrated Circuit Catalog For Design Engineers," First Edition. The other logic components of these circuits may be appropriately selected from this handbook or other similar handbooks of various manufacturers of integrated circuit components.

As mentioned hereinabove the digital speech detector of this invention is composed of two parts, an instantaneous speech detector and a time integrator. The instantaneous speech detector is illustrated in FIG. 39A which has the purpose of examining the incoming 6-bit speech sample of each PCM channel (signals 1TVI1 through 1TVI6) and to determine whether it is active or not. The circuit does this by determining if the amplitude of the sample is above a certain level. If it is, it produces a 1 on the ACTIVE line for that PCM channel. The symbol 1 employed herein means logic one and the symbol 0 employed herein means logic zero.

Of the six bits forming a speech sample five are an indication of the amplitude and one (signal 1TVI1) is an indication of the sign. The sign input bit is inverted in NOT gate 74 and is applied to EXCLUSIVE OR gates 75–79 thereby "EXCLUSIVE ORing" each of the amplitude bits with the sign bit to enable obtaining the absolute value of the quantity. The five outputs of gates 75–79 are now examined to determine whether the absolute magnitude is larger than a set value (the instantaneous threshold), thus indicating channel activity. This in effect, when considering that the instantaneous threshold is both positive and negative, means determine if the coded sample is outside two threshold values. The examination consists of checking whether bit at the output of gate 75 (the most significant of the five outputs) is 1 or whether the remaining four bits represent a binary number larger than a 4-bit number determined by the instantaneous threshold patch 80 which determines the instantaneous threshold value. The patch 80 connects 1 or 0 to four of the inputs of magnitude comparator 81. Comparator 81 compares two 4-bit numbers. The instantaneous threshold is a 5-bit number. The first bit of this number is 0, and the next four bits are determined by the patch. If any or both conditions exist, the channel is said to be instantaneously active and a 1 is generated on the ACTIVE line at the output of OR gate 82. This line is sampled by a 2304 KHz clock in flip flop 83 and fed into the next circuit of the speech detector, namely, the control logic as illustrated in FIG. 39B.

The time integrator circuit or up/down counting circuit operates as a variable slope up/down counting circuit for each of the 48 PCM channels. It counts up when the particular PCM channel is active and down when the channel is inactive. The state of the counting circuit is represented by a 7-bit count and a 2-bit mode code indicating the slope. The state of the counter is stored in the status memory. The status memory stores 48 9-bit words in 9 48-bit shift registers. Each word is the count and mode (slope) for one of the 48 PCM channels. The contents of the status memory are shifted once for each PCM code received, such that the count and slope for a particular PCM channel is available at the output of the status memory when the last bit of that channel's speech sample has entered the transmitter.

Figure 39B:
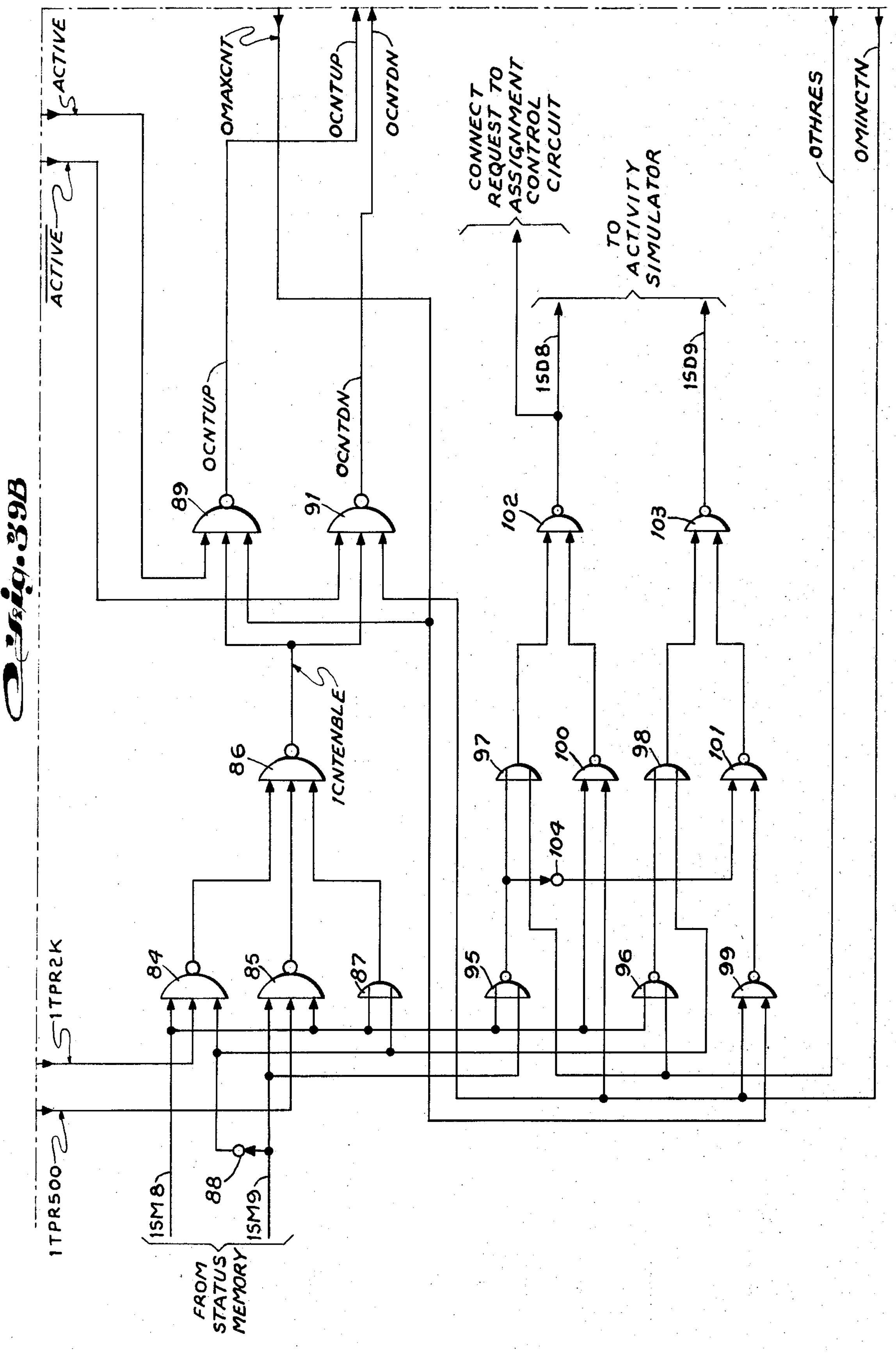

The 2-bit mode code is indicated by bits 8 and 9 of the 9-bit word, which are signals 1SM8 and 1SM9 of FIG. 39B. The mode bits are used by NAND gates 84, 85 and 86, OR gate 87 and NOT gate 88 to enable the counting operation at appropriate times for each signal. For mode 1, bits 8 and 9 are 0 and 1, and the 1CNTENBLE signal enables counting for all PCM words, for all channels in mode 1. Since there are 8000 PCM words per second for each channel, the counting rate is 8000 counts per second. For mode 2, bits 8 and 9 are 1 and 0 and the 1CNTENBLE signal enables counting only when a pulse is received in line 1TPR2K. The pulse rate of the signal 1TPR2K is 2000 pulses per second, and therefore this is the counting rate for mode 2. For mode 3, bits 8 and 9 are 1 and 1 and the 1CNTENBLE signal enables counting only when a pulse is received on the line labeled ITPR500, which has a pulse rate of 500 pulses per second. In summary, the various slopes shown in FIG. 25 are produced by the varied pulse rates according to the mode as presented hereinbelow in TABLE IX.

TABLE IX

| Mode | Bit 8 | Bit 9 | Pulses/Second |
|---|---|---|---|
| 1 | 0 | 1 | 8000 |
| 2 | 1 | 0 | 2000 |
| 3 | 1 | 1 | 500 |

This agrees with TABLE III and column *c* of TABLE II.

When both mode bits are zero, counting is disabled, and the speech detector does not change the 9-bit status word, but the activity simulator is enabled. If, however, either mode bit is a 1, the activity simulator is disabled (does not change the status word) and the speech detector is enabled. In this manner, the status word is changed by only one of the processing circuits (the speech detector and activity simulator) when it is read from the status memory, passed through both processing circuits and written back into the status memory as described hereinabove with respect to FIG. 2. Since the status words are processed separately and independently, the channels can have different modes at the same time. The OCNTUP (count up) signal is enabled (at 0) in NAND gate 89 if the 1CNTENBLE signal enables counting and the count is not maximum (indicated by the signal OMAXCNT produced in comparator 90 of FIG. 39D) and activity is indicated by the signal from flip flop 83 (FIG. 39A). Likewise, the OCNTDN (count down) signal is enabled (at 0) in NAND gate 91 if counting is enabled and inactivity is indicated and the count is not a minimum (indicated by signal OMINCNT) as produced by NOR gates 92 and 93 and NAND gate 94 of FIG. 39D. By including the OMAXCNT and OMINCNT signals in the logic conditions for OCNTUP and OCNTDN, the count is prevented from going above the maximum count or below the minimum count.

Figure 39C:
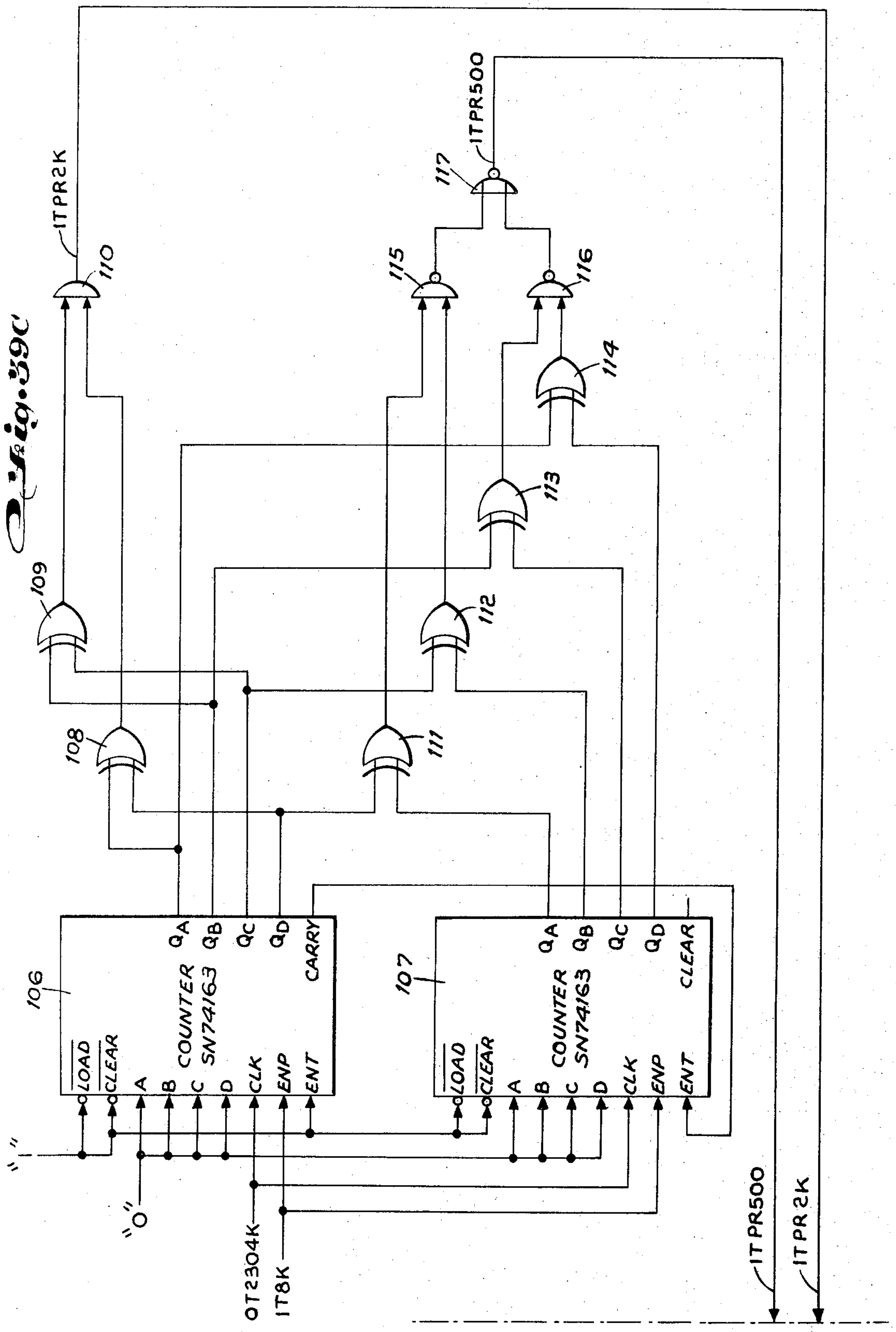
Figure 39D:
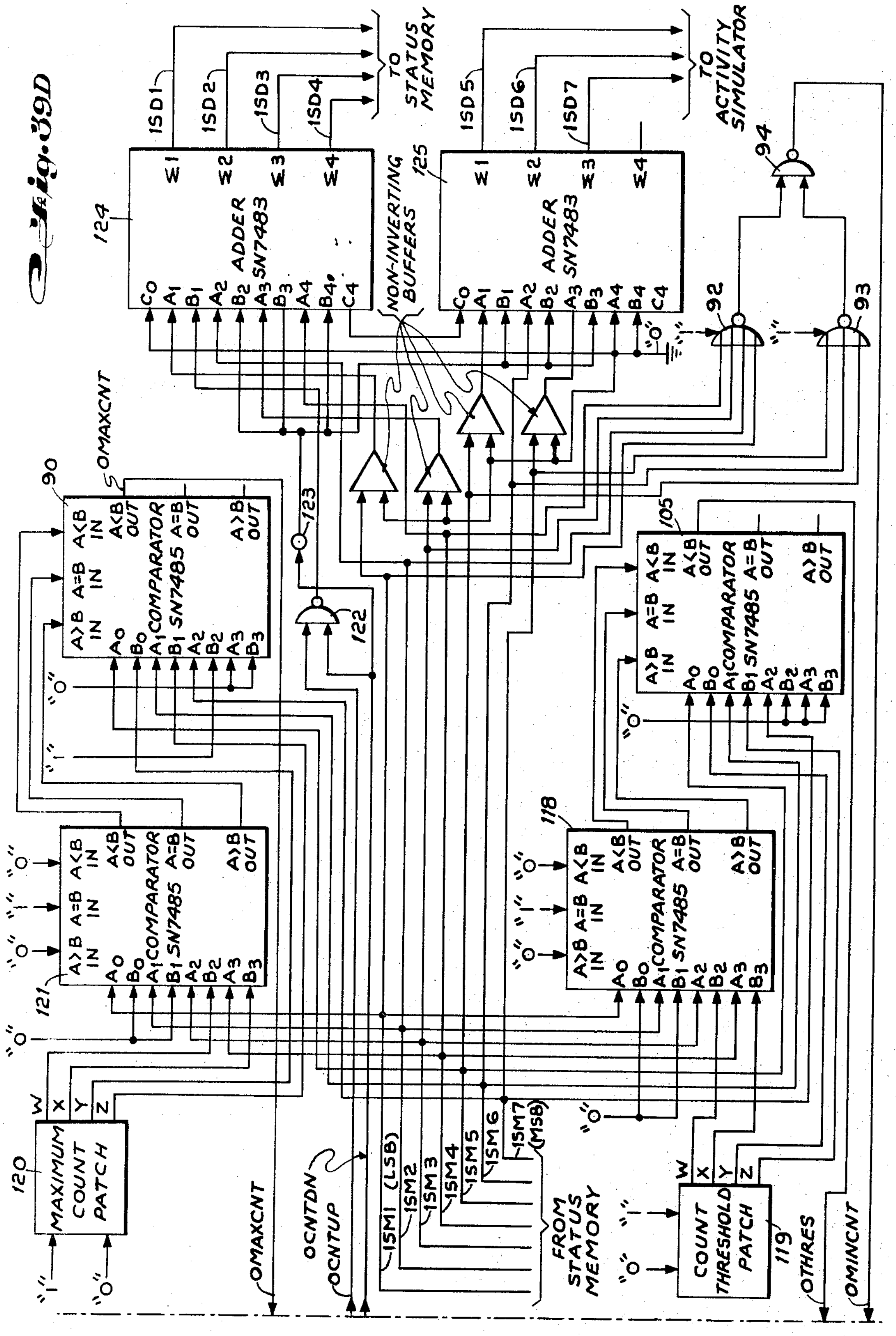

NOR gates 95 and 96, OR gates 97 and 98 and NAND gates 99–103 and NOT gate 104 are used to generate a new mode (signals 1SD8 and 1SD9) from the previous mode (signals 1SM8 and 1SM9) and the conditions "maximum count" (OMAXCNT = 0), "minimum count" (OMINCNT = 0) and "counter over threshold" (OTHRESH = 0) as produced by comparator 105 in FIG. 39D). The mode changes are summarized by the following TABLE X.

TABLE X

| Mode change | Condition |
|---|---|
| 1, 2 3 | maximum count |
| 1 2 | count over threshold |
| 2, 3 1 | minimum count |

For example, if the present mode is 1 or 2 and the maximum count is indicated, the new mode will be 3. For all other conditions, the mode is not changed. For example, if the count is over the threshold, the mode will not be changed if the mode is 3.

In addition signal 1SD8 at the output of NAND gate 102 is the connect request or ACTIVE signal to the assignment control circuit as shown in FIG. 2.

FIG. 39C illustrates how the signals 1TPR500 and 1TPR2K are generated. Counters 106 and 107 are two divide-by-16 (4-bit) counters which together form a divide-by-256 (8-bit) counter. EXCLUSIVE OR gates 108 and 109 and AND gate 110 compare the first two and last two bits of counter 106 in reverse order. That is, the first and last bits are compared, and the second and next to last bits are compared. A pulse is generated whenever a match is obtained for all bit comparisons. This produces four randomly placed pulses for every 16 speech samples, because the clock rate of the counter is the speech sample (PCM code) rate of one speech channel (8KHz). Similarly, EXCLUSIVE OR gates 111, 112, 113 and 114, NAND gates 115, 116 and NOR gate 117 compare the first four and last four bits of counters 106 and 107 in reverse order, producing a pulse for each complete match, or 16 randomly placed pulses for every 256 speech samples.

FIG. 39D illustrates how the signals OMAXCNT, OMINCNT and OTHRESH are generated along with other functions and generation of other signals. The seven signals 1SM1 through 1SM7 represent the 7-bit count from the status memory. As mentioned previously, gates 92, 93 and 94 generate the OMINCNT = 0 only when all seven bits are 0, indicating that the count is equal to zero, the minimum count. Comparators 105 and 118 which compares the count from the status memory with the binary number ZYXWOO, where the binary digitsl ZYXW are obtained from count threshold patch 119 and the last two bits are 0'S. The patch connects logic one or zero voltages to the digit signals ZYXW thus defining the value of the number ZYXWOO which is the threshold value. Comparator 118 and 105 produce OTHRESH = 0 if the count is less than the threshold, and OTHRESH = 1 if the count is equal to or greater than the threshold.

Similarly, maximum count patch 120 defines the maximum count which is compared to the count from the status memory by comparators 121 and 90. Comparators 90 and 121 generate the signal OMAXCNT = 1 when the count is less than maximum and a 0 otherwise. NAND gate 122 and NOT gate 123 generate a binary number according to the signals OCNTUP and OCNTDN. If count up is indicated, +1 is generated. If count down is indicated, −1 is generated. If neither is indicated, 0 is generated. This number, +1, −1 or 0 is added to the count of the status memory by adder circuits 124 and 125, generating a new count (signals 1SD1 through 1SD7), which is the same as the old count only if 0 is added.

The new mode and count are sent to the speech simulator, which makes no changes if the mode is 1, 2 or 3 as explained. The 9-bit word is put into the status memory and while 47 other channels are being processed, the word is shifted through the memory reappearing out of the memory when the corresponding channel is again processed.

While I have described above the principles of my invention in connection with specific apparatus it is to be clearly understood that this description is made only by way of example and not as a limitation to the scope of my invention as set forth in the objects thereof and in the accompanying claims.

I claim:

1. A digital speech detector to detect the presence or absence or speech in a plurality of digital code groups, each of said code groups indicating a quantized amplitude of a speech sample comprising:

a source of said code groups;

first means coupled to said source to detect said quantized amplitude of each of said code groups, said first means producing a first control signal when said detected quantized amplitude is greater than a first threshold value and less than a second threshold value different than said first threshold value and producing a second control signal when said detected quantized amplitude is between said first and second threshold values; and second means coupled to said first means to integrate said first and second control signals and produce a resultant value of integration, said second means producing a first output signal indicating speech activity in said code groups when said value of integration is above a third threshold value and producing a second output signal indicating an absence of speech activity in said code groups when said value of integration is below said third threshold value.

2. A detector according to claim 1, wherein said first threshold value has a given magnitude and a given polarity, and said second threshold value has said given magnitude and a polarity opposite to said given polarity.

3. A detector according to claim 2, wherein said second means includes an integrating counting circuit which counts up in response to said first control signal and counts down in response to said second control signal.

4. A detector according to claim 3, wherein said counting circuit has a minimum count and a maximum count, and said third threshold value is a predetermined count disposed between said minimum count and said maximum count.

5. A detector according to claim 4, wherein said counting circuit has a first counting rate between said minimum count and said predetermined count until said predetermined count is reached, a second counting rate different than said first counting rate between said predetermined count after said predetermined count has been reached and said maximum count until said maximum count is reached and a third counting rate between said maximum count after said maximum count has been reached and said minimum count until said minimum count is reached again.

6. A detector according to claim 1, wherein said second means includes an integrating counting circuit which counts up in response to said first control signal and counts down in response to said second control signal.

7. A detector according to claim 6, wherein said counting circuit has a minimum count and a maximum count, and said third threshold value is a predetermined count disposed between said minimum count and said maximum count.

8. A detector according to claim 7, wherein said counting circuit has a first counting rate between said minimum count and said predetermined count until said predetermined count is reached, a second counting rate different than said first counting rate between said predetermined count after said predetermined count has been reached and said maximum count until said maximum count is reached and a third counting rate between said maximum count after said maximum count has been reached and said minimum count until said minimum count is reached again.

9. A detector according to claim 2, wherein said first means includes an instantaneous amplitude detector to detect said quantized amplitude of each of said code groups, to determine the relationship between said detected quantized amplitude and said first and second threshold value and to produce the appropriate one of said first and second control signals dependent upon said determined relationship.

10. A detector according to claim 9, wherein each of said code groups include

*n* code bits, one of said code bits being a sign bit and the other $(n-1)$ of said code bits are amplitude bits, where *n* is an integer greater than one; and said instantaneous amplitude detector includes a NOT gate coupled to said source responsive to said one of said code bits to invert said one of said code bits, $(n-1)$ EXCLUSIVE OR gates coupled to said source and said NOT gate responsive to said inverted one of said code bits and said $(n-1)$ of said code bits to detect said quantized amplitude of each of said code groups, third means to provide a threshold code representing said given magnitude, a magnitude comparator coupled to $(n-2)$ of said EXCLUSIVE OR gates and said third means to produce a comparator output signal indicative of said relationship between said detected quantized amplitude and said given magnitude and, fourth means coupled to said magnitude comparator and the remaining one of said EXCLUSIVE OR gates to produce said appropriate one of said first and second control signals.

11. A detector according to claim 10, wherein said second means includes an integrating counting circuit which counts up in response to said first control signal and counts down in response to said second control signal.

12. A detector according to claim 11, wherein said integrating counting circuit includes a clock generator to produce two different clocks each having a different number of pseudo-random phases, control logic coupled to said fourth means and said clock generator responsive to said first and second control signals and said two clocks, and count logic coupled to said control logic responsive to signals from said control logic to control the production of said first and second output signal in said control logic.

13. A detector according to claim 12, wherein said code groups appear in successive time division multiplex frames, each of said frames having a predetermined frame rate; and said clock generator includes an 8-stage counter responsive to a clock having said frame rate, a first comparator circuit having a first EXCLUSIVE OR gate coupled to the first and fourth stage of said counter, a second EXCLUSIVE OR gate coupled to the second and third stages of said counter, and a first coincident gate arrangement coupled to the outputs of said first and second EXCLUSIVE OR gates to produce one of said two different clocks having a first given number of pseudo-random phases, and a second comparator circuit having a third EXCLUSIVE OR gate coupled to said fourth and fifth stages of said counter, a fourth EXCLUSIVE OR gate coupled to said third and sixth stages of said counter, a fifth EXCLUSIVE OR gate coupled to said second and seventh stages of said counter, a sixth EXCLUSIVE OR gate coupled to said first and eighth stages of said counter, and a second coincident gate arrangement coupled to the outputs of said third, fourth, fifth and sixth EXCLUSIVE OR gates to produce the other of said two different clocks having a second given number pseudo-random phases, said second given number being different than said first given number.

14. A detector according to claim 13, wherein each of said first and second coincident gate arrangements include an AND gate.

15. A detector according to claim 13, wherein said first coincident gate arrangement includes an AND gate; and said second coincident gate arrangement includes a first NAND gate coupled to the outputs of said third and fourth EXCLUSIVE OR gates, a second NAND gate coupled to the outputs of said fifth and sixth EXCLUSIVE OR gates, and a NOR gate coupled to the outputs of said first and second NAND gates.

16. A detector according to claim 13, wherein said control logic includes first logic circuitry responsive to a first mode code signal representing the mode of operation of said counting circuit during each of said code groups in the immediately preceding one of said frames, each of said two different clocks, each of said first and second control signals, a minimum count signal and a maximum count signal to produce an appropriate one of an up count signal and a down count signal, and second logic circuitry responsive to said first mode code signal, said minimum count signal, said maximum count signal and a threshold signal representing said third threshold level to produce said first and second output signals and a second mode code signal representing the mode of operation of said counting circuit during each of said code groups in the present one of said frames.

17. A detector according to claim 16, wherein said count logic includes an input for a first count code representing said resultant value of integration of each of said code groups in the immediately preceding one of said frames, a first arrangement to produce a maximum count code, a second arrangement to produce a threshold code representative of said third threshold level, a first amplitude comparator coupled to said first arrangement and said input to produce said maximum count signal, a second amplitude comparator coupled to said second arrangement and said input to produce said threshold signal, third logic circuitry coupled to said input to produce said minimum count signal, fourth logic circuitry coupled to said first logic circuitry responsive to said up count and down count signals to produce a digital signal representing a change of integration with respect to said first count code, and an adder circuit coupled to said input and said fourth logic circuitry to produce a second count code representing said resultant value of integration of each of said code groups in the present one of said frames.

18. A detector according to claim 3, wherein said integrating counting circuit includes
a clock generator to produce two different clocks each having a different number of pseudo-random phases,
control logic coupled to said fourth means and said clock generator responsive to said first and second control signals and said two clocks, and
count logic coupled to said control logic responsive to signals from said control logic to control the production of said first and second output signal in said control logic.

19. A detector according to claim 18, wherein
said code groups appear in successive time division multiplex frames, each of said frames having a predetermined frame rate; and
said clock generator includes
an 8-stage counter responsive to a clock having said frame rate,
a first comparator circuit having
a first EXCLUSIVE OR gate coupled to the first and fourth stage of said counter,
a second EXCLUSIVE OR Gate coupled to the second and third stages of said counter, and
a first coincident gate arrangement coupled to the outputs of said first and second EXCLUSIVE OR gates to produce one of said two different clocks having a first given number of pseudo-random phases, and
a second comparator circuit having
a third EXCLUSIVE OR gate coupled to said fourth and fifth stages of said counter,
a fourth EXCLUSIVE OR gate coupled to said third and sixth stages of said counter,
a fifth EXCLUSIVE OR gate coupled to said second and seventh stages of said counter,
a sixth EXCLUSIVE OR gate coupled to said first and eighth stages of said counter, and
a second coincident gate arrangement coupled to the outputs of said third, fourth, fifth and sixth EXCLUSIVE OR gates to produce the other of said two different clocks having a second given number pseudo-random phases, said second given number being different than said first given number.

20. A detector according to claim 19, wherein
each of said first and second coincident gate arrangements include
an AND gate.

21. A detector according to claim 19, wherein
said first coincident gate arrangement includes
an AND gate; and
said second coincident gate arrangement includes
a first NAND gate coupled to the outputs of said third and fourth EXCLUSIVE OR gates,
a second NAND gate coupled to the outputs of said fifth and sixth EXCLUSIVE OR gates, and
a NOR gate coupled to the outputs of said first and second NAND gates.

22. A detector according to claim 19, wherein
said control logic includes
first logic circuitry responsive to a first mode code signal representing the mode of operation of said counting circuit during each of said code groups in the immediately preceding one of said frame, each of said two different clocks, each of said first and second control signals, a minimum count signal and a maximum count signal to produce an appropriate one of an up count signal and a down count signal, and
second logic circuitry responsive to said first mode code signal, said minimum count signal, said maximum count signal and a threshold signal representing said third threshold level to produce said first and second output signals and a second mode code signal representing the mode of operation of said counting circuit during each of said code groups in the present one of said frames.

23. A detector according to claim 22, wherein
said count logic includes
an input for a first count code representing said resultant value of integration of each of said code groups in the immediately preceding one of said frames,
a first arrangement to produce a maximum count code,
a second arrangement to produce a threshold code representative of said third threshold level,
a first amplitude comparator coupled to said first arrangement and said input to produce said maximum count signal,
a second amplitude comparator coupled to said second arrangement and said input to produce said threshold signal,
third logic circuitry coupled to said input to produce said minimum count signal,
fourth logic circuitry coupled to said first logic circuitry responsive to said up count and down count signals to produce a digital signal representing a change of integration with respect to said first count code, and
an adder circuit coupled to said input and said fourth logic circuitry to produce a second count code representing said resultant value of integration of each of said code groups in the present one of said frames.

* * * * *